United States Patent
Takeuchi et al.

(10) Patent No.: US 10,481,838 B2
(45) Date of Patent: Nov. 19, 2019

(54) COMMUNICATION DEVICE, AND NON-TRANSITORY COMPUTER-READABLE RECORDING MEDIUM STORING COMPUTER-READABLE INSTRUCTIONS FOR COMMUNICATION DEVICE

(71) Applicant: Brother Kogyo Kabushiki Kaisha, Nagoya-shi, Aichi-ken (JP)

(72) Inventors: Shun Takeuchi, Kiyosu (JP); Hirotaka Asakura, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/202,178

(22) Filed: Nov. 28, 2018

(65) Prior Publication Data

US 2019/0163415 A1 May 30, 2019

(30) Foreign Application Priority Data

Nov. 30, 2017 (JP) .................................. 2017-230317

(51) Int. Cl.
*G06F 3/12* (2006.01)
*H04W 4/80* (2018.01)
(Continued)

(52) U.S. Cl.
CPC .......... *G06F 3/1209* (2013.01); *G06F 3/1231* (2013.01); *H04N 1/00315* (2013.01);
(Continued)

(58) Field of Classification Search
CPC .............................. G06F 3/1209; H04W 4/80
See application file for complete search history.

(56) References Cited

U.S. PATENT DOCUMENTS

2006/0094356 A1* 5/2006 Dawidowsky ....... G06K 7/0008
455/41.1
2014/0342665 A1* 11/2014 Amano ................. H04W 36/14
455/41.1

(Continued)

FOREIGN PATENT DOCUMENTS

JP 2013-157736 A 8/2013
JP 2017-182626 A 10/2017

OTHER PUBLICATIONS

Wi-Fi Alliance Technical Committee P2P Task Group, "Wi-Fi Peer-to Peer (P2P) Technical Specification", Version 1.1, pp. 1-159, 2010.

*Primary Examiner* — Ibrahim Siddo
(74) *Attorney, Agent, or Firm* — Banner & Witcoff, Ltd.

(57) ABSTRACT

The communication device may include a wireless interface configured to repeat operating sequentially in a plurality of states including a first state and a second state, a processor and a main memory. The communication device may acquire detection information from the wireless interface in a case where the wireless interface operating in the second state receives a second polling signal from a specific external device. The communication device may supply a specific signal to the wireless interface in a case where the detection information is acquired from the wireless interface operating in the second state, the specific signal being for causing the wireless interface to use, as a duration time period of the second state, a specific time period instead of the second predetermined time period, the specific time period being longer than the second predetermined time.

23 Claims, 11 Drawing Sheets

(51) Int. Cl.
*H04W 72/04* (2009.01)
*H04N 1/00* (2006.01)
(52) U.S. Cl.
CPC ......... *H04W 4/80* (2018.02); *H04W 72/0446* (2013.01); *G06F 3/128* (2013.01); *G06F 3/1292* (2013.01)

(56) References Cited

U.S. PATENT DOCUMENTS

2015/0365990 A1* 12/2015 Tanaka .................. H04W 8/005
 455/41.1
2016/0192260 A1 6/2016 Amano \* cited by examiner

COMMUNICATION DEVICE, AND NON-TRANSITORY COMPUTER-READABLE RECORDING MEDIUM STORING COMPUTER-READABLE INSTRUCTIONS FOR COMMUNICATION DEVICE

CROSS-REFERENCE TO RELATED APPLICATION

This application claims priority to Japanese Patent Application No. 2017-230317, filed on Nov. 30, 2017, the entire contents of which are hereby incorporated by reference into the present application.

TECHNICAL FIELD

The disclosure herein discloses a communication device provided with a wireless interface capable of establishing a communication link with an external device.

BACKGROUND ART

A system provided with a printer and a digital camera is known. The printer acquires a list of operation modes in which the digital camera is capable of operating. In a case where the digital camera is capable of operating in a P2P (abbreviation of Peer To Peer) mode in an NFC (abbreviation of Near Field Communication) scheme, the printer causes the digital camera to operate in the P2P mode to send communication parameters to the digital camera. On the other hand, in a case where the digital camera is not capable of operating in the P2P mode, the printer causes the digital camera to operate in a CE (abbreviation of Card Emulation) mode of the NFC scheme to send the communication parameters to the digital camera.

SUMMARY

The disclosure herein provides a new technique for a wireless interface of a communication device to establish a suitable wireless link with an external device.

A communication device disclosed herein may comprise: a wireless interface configured to repeat operating sequentially in a plurality of states including a first state and a second state, the first state being a state where the wireless interface sends a first polling signal over a first predetermined time period, the first polling signal being for establishing a wireless link with an external device, the second state being a state where the wireless interface waits for receiving a second polling signal over a second predetermined time period, the second polling signal being for establishing a wireless link with the communication device and being sent from an external device; a processor; and a main memory storing computer-readable instructions therein, the computer-readable instructions, when executed by the processor, causing the communication device to: acquire detection information from the wireless interface in a case where the wireless interface operating in the second state receives the second polling signal from a specific external device; and supply a specific signal to the wireless interface in a case where the detection information is acquired from the wireless interface operating in the second state, the specific signal being for causing the wireless interface to use, as a duration time period of the second state, a specific time period instead of the second predetermined time period, the specific time period being longer than the second predetermined time.

A communication device disclosed herein may comprise: a wireless interface configured to execute a wireless communication according to a Near Field Communication (NFC) scheme; a processor; and a main memory storing computer-readable instructions therein, the computer-readable instructions, when executed by the processor, causing the communication device to: acquire detection information from the wireless interface in a case where a polling signal is received from a specific device in the wireless interface under a state where at least a Peer to Peer (P2P) mode of the NFC scheme is enabled; and supply a specific signal to the wireless interface in a case where the detection information is acquired from the wireless interface in which at least the P2P mode is enabled, the specific signal being for causing the wireless interface to achieve a state where the P2P mode is disabled and at least one mode of a Card Emulation (CE) mode and a Reader/Writer (R/W) mode of the NFC scheme is enabled.

A control method, a computer program, and a computer-readable recording medium that stores the computer program for realizing the above communication are also new and useful. Further, a communication system provided with the above communication device and the specific external device is also new and useful.

BRIEF DESCRIPTION OF THE DRAWINGS

EMBODIMENTS (Configuration of Communication System 2; FIG. 1)

As shown in FIG. 1, a communication system 2 includes a printer 10, a plurality of mobile terminals 100A to 100C, and a card 200. Each of the device 10, 100A to 100C, 200 is capable of executing an NFC communication being a wireless communication in an NFC (abbreviation of Near Field Communication) scheme with each other.

(Configuration of Printer 10)

Figure 1:
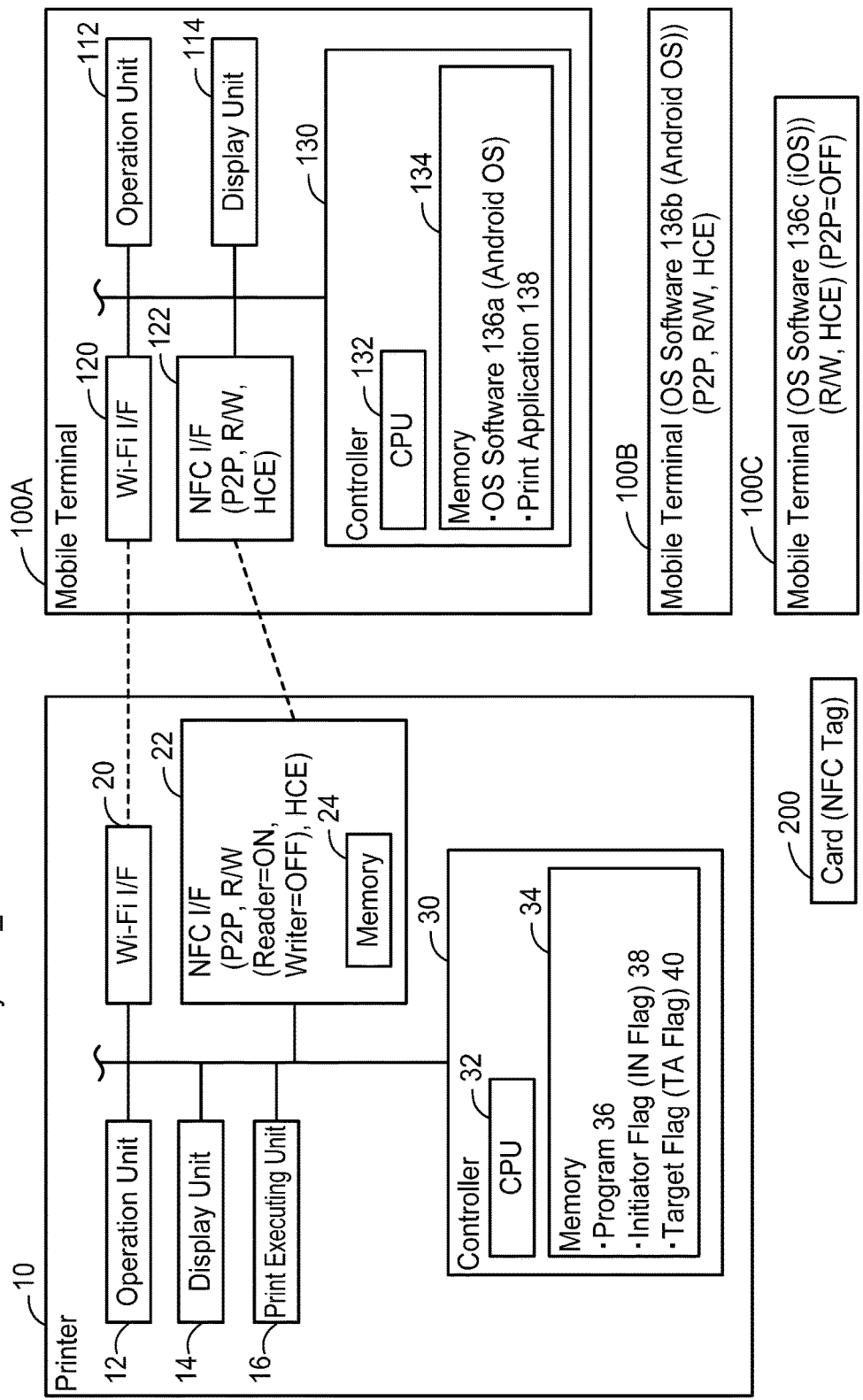
FIG. 1 shows a configuration of a communication system.

The printer 10 is a peripheral device capable of executing a printing function (that is, a peripheral device for the mobile terminal 100A, etc.), and includes an operation unit 12, a display unit 14, a print executing unit 16, a Wi-Fi interface (hereinbelow, an interface will be denoted "I/F") 20, an NFC I/F 22, and a controller 30.

The operation unit 12 includes a plurality of keys. A user can operate the operation unit 12 to input various instruction to the printer 10. The display unit 14 is a display for displaying various types of information. The display unit 14 also functions as a so-called touch panel (that is, the operation unit). The print executing unit 16 is a printing mechanism of an inkjet scheme or a laser scheme.

The Wi-Fi I/F 20 is an I/F for executing a Wi-Fi communication being a wireless communication in a Wi-Fi scheme. The Wi-Fi scheme is for example a wireless communication scheme based on an 802.11 standard of IEEE (abbreviation of the Institute of Electrical and Electronics Engineers, Inc.), and standards complying thereto (such as 802.11a, 11b, 11g, 11n, 11ac, etc.), for example. More specifically, the Wi-Fi I/F 20 supports a WFD (abbreviation of Wi-Fi Direct (registered trademark)) scheme established by the Wi-Fi Alliance. The WFD scheme is a wireless communication scheme described in the standard manual "Wi-Fi Peer-to-Peer (P2P) Technical Specification Version 1.1" drafted by the Wi-Fi Alliance.

The NFC I/F 22 includes a memory 24. The NFC I/F 22 is an I/F for executing an NFC communication. An NFC scheme is a wireless communication scheme based on the international standard ISO/IEC14443, 15693, 18092, for example. As types of I/F for executing the NFC communication, an I/F called an NFC forum device and an I/F called an NFC tag are known. The NFC forum device is an I/F capable of selectively operating in one of a P2P (abbreviation of Peer To Peer) mode, an R/W (abbreviation of Reader/Writer) mode, and an HCE (abbreviation of Host Card Emulation) mode. The NFC tag is not an I/F capable of selectively operating in one of these modes, and it functions as an IC (abbreviation of Integrated Circuit) tag in the NFC scheme. The NFC I/F 22 is an NFC forum device.

The P2P mode is a mode for executing a bidirectional communication between one NFC device operating in the P2P mode and another NFC device operating in the P2P mode. The R/W mode and the HCE mode are modes for executing a unidirectional communication between one NFC device operating in the R/W mode and another NFC device operating in the HCE mode. The HCE mode is a CE mode which requires a secure element. A Reader mode included in the R/W mode is a mode for reading data from the NFC device operating in the HCE mode (that is, receiving data therefrom). A Writer mode included in the R/W mode is a mode for writing data in the NFC device operating in the HCE mode (that is, sending data thereto). The NFC device operating in the R/W mode can read data from the NFC tag and write data in the NFC tag. The NFC I/F 22 is capable of operating in the Reader mode included in the R/W mode (that is, it enables the Reader mode) but is not capable of operating in the Writer mode (that is, it disables the Writer mode). When information is written in the NFC device being a communication counterpart, there is a possibility that this NFC device may execute an unintended operation and a problem may arise, so the NFC I/F 22 has the Writer mode disabled from a viewpoint of security.

The NFC I/F 22 operates in an Initiator state or in a Target state. The Initiator state is a state in which a polling signal for establishing an NFC link with an external device is sent repeatedly. The Target state is a state in which it waits to receive a polling signal sent from the external device.

In a case where the NFC I/F 22 operates in the Initiator state to send the polling signal and it receives a response signal to this polling signal from the external device operating in the Target state, an NFC link with this external device is established. The NFC link established at this occasion is a P2P link or a R/W-CE link. The P2P link is an NFC link in which both the NFC I/F 22 and the external device operate in the P2P mode. The R/W-CE link is an NFC link in which the NFC I/F 22 operates in the R/W mode and the external device operates in the HCE mode.

Further, in a case where the NFC I/F 22 receives a polling signal from the external device operating in the Initiator state while the NFC I/F 22 is operating in the Target state, it sends a response signal for this polling signal to the external device and establishes the NFC link with this external device. The NFC link established at this occasion is a P2P link or a CE-R/W link. The CE-R/W link is an NFC link in which the NFC I/F 22 operates in the HCE mode and the external device operates in the R/W mode.

The NFC I/F 22 shifts from the Initiator state to the Target state after having operated in the Initiator state over a predetermined Initiator time period (hereinbelow termed "IN time period"). Further, the NFC I/F 22 shifts from the Target state to the Initiator state after having operated in the Target state over a predetermined Target time period (hereinbelow termed "TA time period"). That is, the NFC I/F 22 repeats to operate sequentially in the Target state and in the Initiator state. As the IN time period and the TA time period for the NFC I/F 22, respectively, a time period t1 and a time period t2 are preset.

Next, a difference between the Wi-Fi I/F 20 and the NFC I/F 22 will be described. A communication speed of the Wi-Fi communication using the Wi-Fi I/F 20 (such as its maximum communication speed of 11 Mbps to 6.9 Gbps) is faster than a communication speed of the NFC communication using the NFC I/F 22 (such as its maximum communicating speed of 100 to 424 Kbps). Further, a frequency of carrier waves in the Wi-Fi communication using the Wi-Fi I/F 20 (such as a 2.4 GHz range and a 5.0 GHz range) is different from a frequency of carrier waves in the NFC communication using the NFC I/F 22 (such as 13.56 MHz range). Further, a maximum distance by which the Wi-Fi communication using the Wi-Fi I/F 20 can be executed (such as about 100 m at maximum) is greater than a maximum distance by which the NFC communication using the NFC I/F 22 can be executed (such as about 10 cm at maximum).

The controller 30 includes a CPU 32 and a memory 34. The CPU 32 executes various processes according to a program 36 stored in the memory 34. The memory 34 is configured of a volatile memory and a nonvolatile memory. The memory 34 stores an Initiator flag (hereinbelow termed "IN flag") 38 and a Target flag (hereinbelow termed "TA flag") 40.

The IN flag 38 is changed from "0" to "1" in a case where a determination is made that the P2P link with the external device cannot be established when the NFC I/F 22 is operating in the Initiator state. Further, a TA flag 40 is changed from "0" to "1" in a case where establishment of the P2P link with the external device fails when the NFC I/F 22 is operating in the Target state.

(Configuration of Mobile Terminals 100A to 100C)

A mobile terminal 100A is a mobile terminal device such as a cell phone, a smartphone, a PDA, a portable music player, and a portable video player. The mobile terminal 100A includes an operation unit 112, a display unit 114, a Wi-Fi I/F 120, an NFC I/F 122, and a controller 130.

The operation unit 112 includes a plurality of keys. A user can operate the operation unit 112 to input various instructions to the mobile terminal 100A. The display unit 114 is a display for displaying various types of information. The display unit 114 functions as a so-called touch panel (that is, the operation unit). The Wi-Fi I/F 120 is similar to the Wi-Fi I/F 20 of the printer 10. The NFC I/F 122 is similar to the NFC I/F 22 of the printer 10 except in that it is capable of operating in both the Reader mode and the Writer mode in the R/W mode.

The controller 130 includes a CPU 132 and a memory 134. The CPU 130 executes various processes according to OS (abbreviation of Operating System) software 136a stored in the memory 134. The OS software 136a is software for controlling various basic operations of the mobile terminal 100A. In the present embodiment, a situation is assumed in which the OS software 136a is an Android (registered trademark) OS. Further, the memory 134 stores a print application 138. The print application 138 is an application provided by a vendor of the printer 10, and is installed in the mobile terminal 100A for example from a server on the Internet. The print application 138 is an application for causing a Wi-Fi connection to be established between the mobile terminal 100A and the printer 10 and sending print data representing a print target image to the printer 10 using this Wi-Fi connection.

The mobile terminal 100B has a similar configuration as the mobile terminal 100A. In the present embodiment, a situation is assumed in which OS software 136b of the mobile terminal 100B is an Android OS. However, a situation is assumed in which a vendor of the mobile terminal 100B is different from a vendor of the mobile terminal 100A.

The mobile terminal 100C has a similar configuration as the mobile terminal 100A except that its NFC I/F (not shown) is incapable of operating in the P2P mode (i.e., the P2P mode is disabled therein). In the present embodiment, a situation is assumed in which OS software 136c of the mobile terminal 100C is an iOS (registered trademark).

(Configuration of Card 200)

The card 200 is a card owned for example by a user of the printer 10. The card 200 includes an NFC I/F being an NFC tag. For example, the user causes for example a PC that is not shown to execute sending print data to the printer 10. In so doing, the print data is associated with a user ID which identifies this user. After this, when the user brings the card 200 close to the printer 10, an NFC link is established between the printer 10 and the card 200, and the user ID as aforementioned which is stored in advance in the card 200 is sent to the printer 10. In this case, the printer 10 determines that authentication of the user ID has succeeded, and executes printing according to the aforementioned print data. That is, the card 200 is an authentication card for authenticating the user ID.

(Processes Executed by Respective Devices 10, Etc.; FIGS. 2 to 11)

Processes executed by the respective devices 10, etc. will be described with reference to FIGS. 2 to 11. In each sequence diagram (e.g., in FIG. 2), arrows with thin lines indicate an NFC communication using an NFC I/F (e.g., 22), and arrows with bold lines indicate a Wi-Fi communication using a Wi-Fi I/F (e.g., 20). Hereinbelow, in describing communications, the description "using the NFC I/F (or the Wi-Fi I/F)" will be omitted unless it required specific explanation in regard thereto. Further, in an initial state in each drawing, the printer 10 is operating in a Group Owner (hereinbelow termed "G/O") state in the WFD scheme, and the memory 24 of the NFC I/F 22 stores, in advance, wireless setting information (SSID, password, etc.) to be used in a wireless network in which the printer 10 operates as G/O. Further, in the initial state in each drawing, all of the P2P mode, the R/W mode, and the HCE mode of the NFC I/F 22 of the printer 10 are enabled (i.e., ON). However, the Writer mode in the R/W mode is disabled (i.e., OFF).

Figure 2:
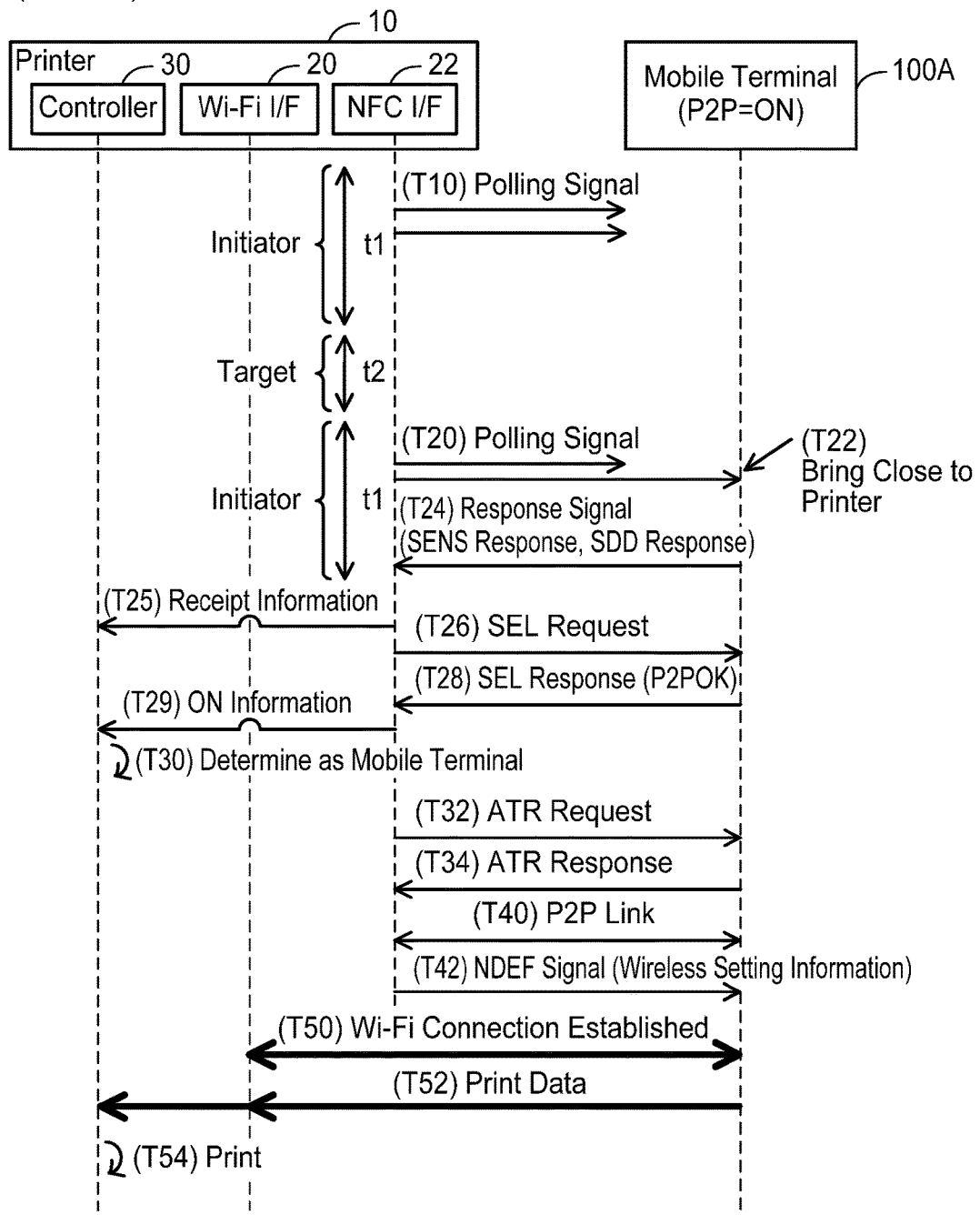
FIG. 2 shows a sequence diagram of Case A1 in which a P2P link is established between a printer under an Initiator state and a mobile terminal.

(Case A1; FIG. 2)

In Case A1, a P2P link is established between the printer 10 that operates in the Initiator state and the mobile terminal 100A provided with the Android OS 136a. In the initial state of Case A1, all of the P2P mode, the R/W mode, and the HCE mode of the NFC I/F 122 of the mobile terminal 100A are ON.

The NFC I/F 22 of the printer 10 repeats to sequentially operate in the Initiator state and in the Target state. Specifically, in T10, the NFC I/F 22 operates in the Initiator state and sends a polling signal. When the NFC I/F 22 operates in the Initiator state over the time period t1 (i.e., the IN time period) without receiving any response signal from the external device to the polling signal, it shifts from the Initiator state to the Target state. Further, when the NFC I/F 22 operates in the Target state over the time period t2 (i.e., the TA time period) without receiving any polling signal from the external device, it shifts from the Target state to the Initiator state, and restarts to send the polling signal in T20.

In T22, a user activates the print application 138 in the mobile terminal 100A and brings the mobile terminal 100A close to the printer 10, the NFC I/F 122 of the mobile terminal 100A receives a polling signal from the printer 10, and sends a response signal to the printer 10 in T24. The response signal includes a SENS response and an SDD response, where the SDD response includes an ID of the mobile terminal 100A, and the SENS response includes information indicating that a data size of the ID is 4 bytes. In a case where a source that had sent the response signal as above is the card 200, the SENS response includes information indicating that the data size of the ID of the card 200 is 7 bytes.

When the response signal is received from the mobile terminal 100A in T24, the NFC I/F 22 of the printer 10 supplies receipt information including the ID of the mobile terminal 100A and the information indicating that the data size of the ID is 4 bytes as included in the response signal to the controller 30 in T25, and sends a SEL request to the mobile terminal 100A in T26.

When the SEL request is received from the printer 10 in T26, the NFC I/F 122 of the mobile terminal 100A sends a SEL response including information "P2POK", which indicates that the P2P mode is ON, to the printer 10 in T28.

When the SEL response is received from the mobile terminal 100A in T28, the NFC I/F 22 of the printer 10 supplies ON information indicating that the P2P mode of the mobile terminal 100A is ON to the controller 30 in T29. Then, the controller 30 uses the receipt information acquired in T25 to determine whether its communication counterpart is a mobile terminal or a card in T30. In the present case, since the information of the data size of the ID in the receipt information is 4 bytes, the controller 30 determines that the communication counterpart is a mobile terminal. Then, the controller 30 supplies information indicating that the communication counterpart is a mobile terminal to the NFC I/F 22. In a variant, the controller 30 may use the ID in the receipt information to determine whether its communication counterpart is a mobile terminal or a card.

Further, since the SEL response received in T28 includes the information "P2POK", the NFC I/F 22 of the printer 10 sends an ATR request for requesting to establish the P2P link to the mobile terminal 100A in T32, and receives an ATR response from the mobile terminal 100A in T34. As a result, in T40, the P2P link is established between the NFC I/F 22 of the printer 10 and the NFC I/F 122 of the mobile terminal 100A. When the ATR response is received in T34, the NFC I/F 22 may supply a signal including information included in the ATR response to the controller 30.

The NFC I/F 22 of the printer 10 sends an NDEF (abbreviation of NFC Data Exchange Format) signal including the wireless setting information stored in the memory 24 to the mobile terminal 100A by using the P2P link in T42. Then, a communication using the wireless setting information is executed between the Wi-Fi I/F 20 of the printer 10 and the Wi-Fi I/F 120 of the mobile terminal 100A, and a Wi-Fi connection is established between the Wi-Fi I/F 20 and the Wi-Fi I/F 120 in T50.

The controller 30 of the printer 10 uses the Wi-Fi connection in T52 to receive the print data representing the print target image from the mobile terminal 100A via the Wi-Fi I/F 20. Then, the controller 30 supplies the print data to the print executing unit 16 in TM and causes the print executing unit 16 to execute printing of the image represented by the print data.

As aforementioned, in the present embodiment, the Wi-Fi connection is established after the NFC link has been established between the printer 10 and the mobile terminal 100A, and the print data is communicated using the Wi-Fi connection. The communication speed of the Wi-Fi communication is faster than the communication speed of the NFC communication. Due to this, as compared to a case of communicating the print data using the NFC communication, the print data can be communicated at high speed. Further, the user simply needs to bring the mobile terminal 100A close to the printer 10 to establish the Wi-Fi connection between the printer 10 and the mobile terminal 100A. Thus, the user can easily cause the Wi-Fi connection to be established.

Figure 3:
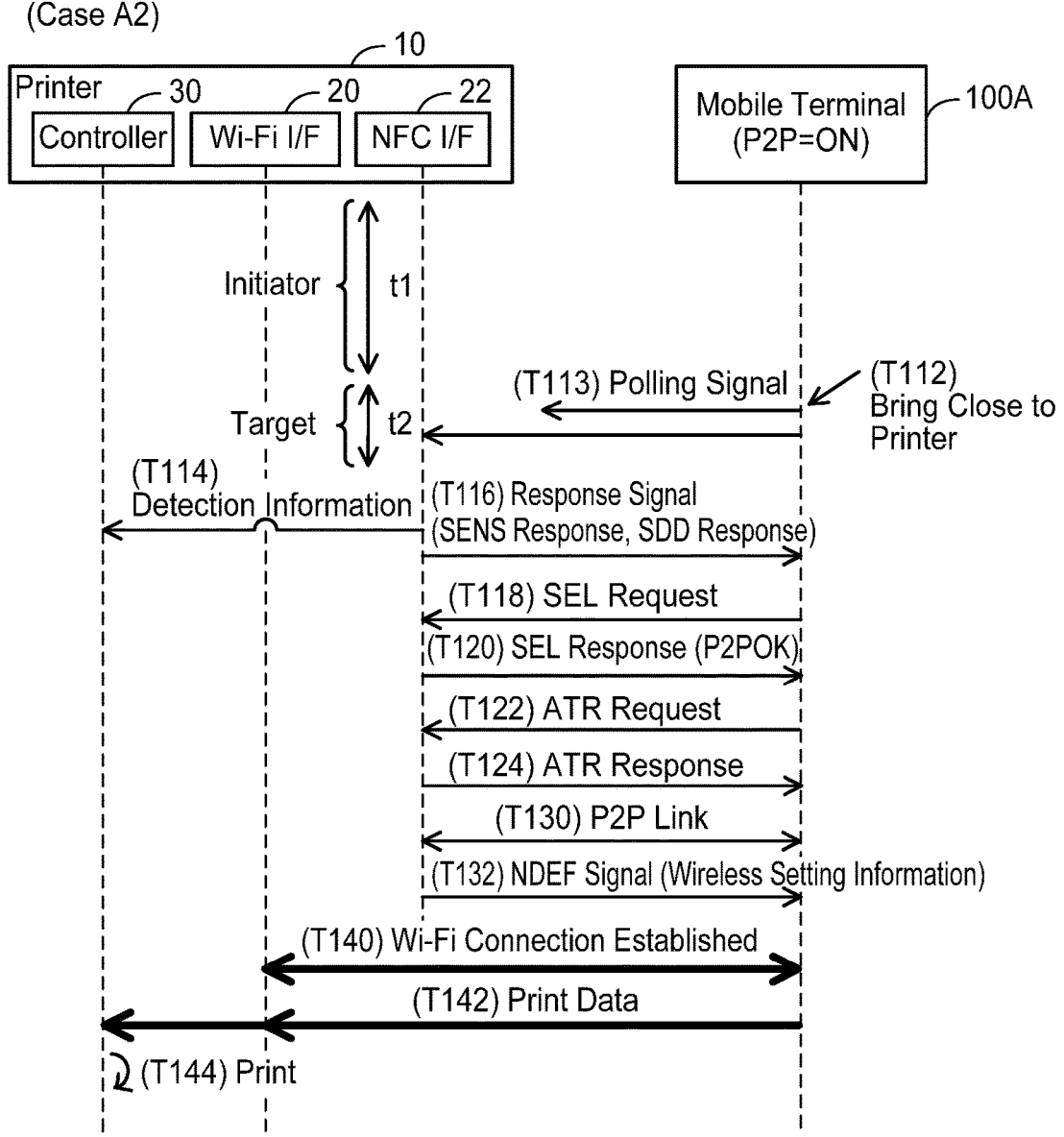
FIG. 3 shows a sequence diagram of Case A2 in which the P2P link is established between the printer under a Target state and the mobile terminal.

(Case A2; FIG. 3)

Next, Case A2 in which a P2P link is established between the printer 10 operating in the Target state and the mobile terminal 100A will be described with reference to FIG. 3. The initial state of Case A2 is similar to Case A1.

In T112, when the user brings the mobile terminal 100A close to the printer 10, the NFC I/F 22 of the printer 10 operating in the Target state receives a polling signal from the mobile terminal 100A in T113. When the polling signal is received from the mobile terminal 100A, the NFC I/F 22 determines that a magnetic field surrounding the NFC I/F 22 has changed, and supplies detection information indicating that a change in the magnetic field has been detected to the controller 30 in T114. By acquiring the detection information from the NFC I/F 22, the controller 30 can acknowledge that its communication counterpart is approaching.

The NFC I/F 22 of the printer 10 sends the response signal including the SENS response and the SDD response to the mobile terminal 100A in T116, and receives the SEL request from the mobile terminal 100A in T118. Since the P2P mode is ON in the NFC I/F 22, it sends the SEL response including the information "P2POK" to the mobile terminal 100A in T120. Then, in T122, the NFC I/F 22 receives the ATR request from the mobile terminal 100A, and sends the ATR response to the mobile terminal 100A in T124. Following T130 to T144 are similar to T40 to TM of FIG. 2. In receiving the SEL request from the mobile terminal 100A in T118, the NFC I/F 22 may supply a signal including information included in the SEL request to the controller 30. Further, when the ATR request is received from the mobile terminal 100A in T122, the NFC I/F 22 may supply a signal including information included in the ATR request to the controller 30.

As shown in Case A1 of FIG. 2 and Case A2 of FIG. 3, the printer 10 can establish the P2P link with the mobile terminal 100A and establish the Wi-Fi connection with the mobile terminal 100A in either cases where the NFC I/F 22 communicates the polling signal with the mobile terminal 100A by being in the Initiator state or in the Target state.

Figure 4:
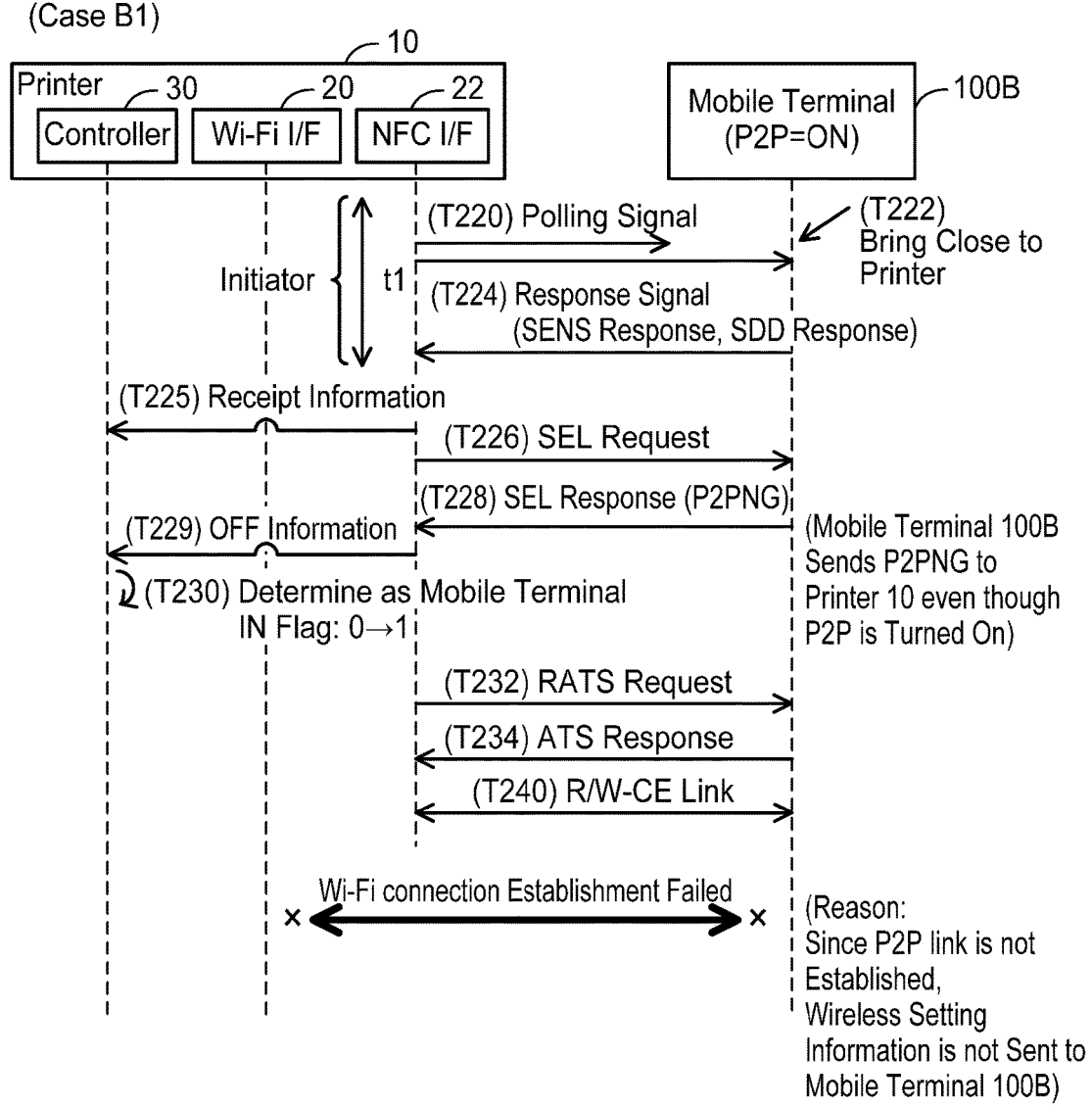
FIG. 4 shows a sequence diagram of Case B1 in which a R/W-CE link is established between the printer under the Initiator state and the mobile terminal.

(Case B1; FIG. 4)

Next, Case B1 will be described with reference to FIG. 4. In Case B1, a R/W-CE link is established between the printer 10 operating in the Initiator state and the mobile terminal 100B provided with the Android OS 136b. In the initial state of FIG. 4, all of the P2P mode, the R/W mode, and the HCE mode of the NFC I/F (not shown) of the mobile terminal 100B are ON.

T220 to T226 are similar to T20 to T26 of FIG. 2 except that the mobile terminal 100B is the communication counterpart. When the SEL request is received from the printer 10 in T226, the NFC I/F of the mobile terminal 100B sends the SEL response including information "P2PNG" indicating that the P2P mode is OFF to the printer 10 in T228, although the P2P mode is actually ON. In T228, the NFC I/F of the mobile terminal 100B sending the SEL response including information "P2PNG" is likely due to a malfunction of the mobile terminal 100B.

When the SEL response is received from the mobile terminal 100B in T228, the NFC I/F 22 of the printer 10 supplies OFF information indicating that the P2P mode of the mobile terminal 100B is OFF to the controller 30 in T229. The controller 30 uses the receipt information acquired in T225 to determine that its communication counterpart is a mobile terminal in T230, and further determines that the P2P link cannot be established with the communication counterpart based on the OFF information acquired in T229. As a result, the controller 30 changes the IN flag 38 from "0" to "1". Further, controller 30 supplies information indicating that the communication counterpart is a mobile terminal to the NFC I/F 22. As shown in T29 of Case A1 of FIG. 2, in the case of acquiring the ON information from the NFC I/F 22, the controller 30 determines that the P2P link with the communication counterpart can be established, and as a result, it does not change the IN flag 38 from "0" to "1". In a variant, the controller 30 may be configured to change the IN flag 38 from "0" to "1" in a case where the OFF information is acquired over a predetermined number of times that is equal to or greater than twice. Further, in another variant, after the processes of T232 to T240 are completed, the controller 30 may determine whether the communication counterpart is a mobile terminal or a card and whether or not the P2P link can be established with the communication counterpart.

Since the SEL response received in T228 includes the information "P2PNG", the NFC I/F 22 of the printer 10 sends a RATS request for requesting to establish the R/W-CE link to the mobile terminal 100B in T232, and in T234, it receives an ATS response from the mobile terminal 100B. As a result, in T240, the R/W-CE link is established between the NFC I/F 22 of the printer 10 and the NFC I/F of the mobile terminal 100B. In this embodiment, the NFC I/F 22 uses a R/W-Card link to execute communication with a card in a case where the R/W-Card link is established with the card, however, in a case where a R/W-CE link is established with a mobile terminal, it is configured not to execute communication with the mobile terminal using the R/W-CE link. Since the NFC I/F 22 has already acquired the information indicating that the communication counterpart is a mobile terminal from the controller 30, it disconnects the R/W-CE link without executing the communication with the mobile terminal 100B using the R/W-CE link. As a result, the NFC I/F 22 cannot send the wireless setting information to the mobile terminal 100B. Thus, in this case, the Wi-Fi connection between the printer 10 and the mobile terminal 100B is not established.

In a variant, the NFC I/F 22 of the printer 10 may be configured to execute communication with the mobile terminal using the R/W-CE link even in the event where the communication counterpart is a mobile terminal. In this variant, the NFC I/F 22 sends a Read signal for reading data from the mobile terminal 100B to the mobile terminal 100B and receives SMP information from the mobile terminal 100B using the R/W-CE link established in T240. Here, the SMP information includes a terminal ID used for authenticating the mobile terminal 100B, for example. Since the NFC I/F 22 can operate only in the Reader mode, it can receive the SMP information from the mobile terminal 100B, however, it cannot send the wireless setting information to the mobile terminal 100B. Thus, in this variant as well, the Wi-Fi connection is not established between the printer 10 and the mobile terminal 100B. Further, in another variant, the controller 30 may supply the NFC I/F 22 with a signal to request prohibiting the communication for establishing the R/W-CE link with the communication counterpart in the case of changing the IN flag 38 from "0" to "1". That is, the processes of T232 to T240 may be omitted.

Figure 5:
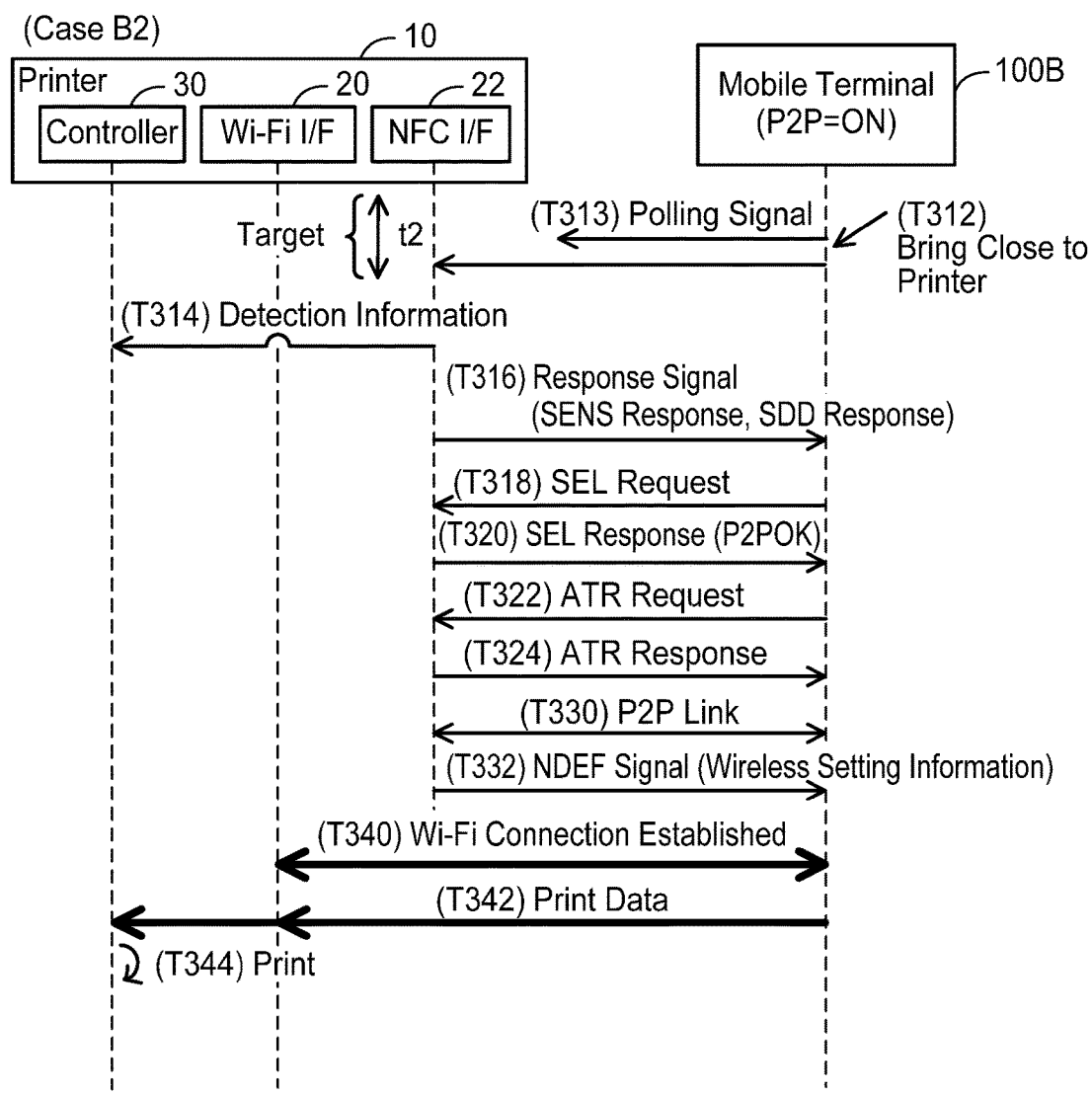
FIG. 5 shows a sequence diagram of Case B2 in which the P2P link is established between the printer under the Target state and the mobile terminal.

(Case B2; FIG. 5)

Next, Case B2 in which a P2P link is established between the printer 10 operating in the Target state and the mobile terminal 100B will be described with reference to FIG. 5. All of processes T312 to T344 shown in Case B2 are similar to T112 to T144 of FIG. 3 except that the mobile terminal 100B is the communication counterpart.

As shown in Case B1 of FIG. 4, in the case where the NFC I/F 22 executes the communication of the polling signal with the mobile terminal 100B by being in the Initiator state, the printer 10 establishes the R/W-CE link with the mobile terminal 100B, however, it cannot send the wireless setting information to the mobile terminal 100B using the R/W-CE link. Due to this, the printer 10 cannot establish the Wi-Fi connection with the mobile terminal 100B. On the other hand, as shown in Case B2 of FIG. 5, in the case where the NFC I/F 22 executes the communication of the polling signal with the mobile terminal 100B by being in the Target state, the printer 10 can establish the P2P link with the mobile terminal 100B and send the wireless setting information to the mobile terminal 100B using the P2P link. Due to this, the printer 10 can establish the Wi-Fi connection with the mobile terminal 100B. That is, the P2P link established between the printer 10 and the mobile terminal 100B can be said as being a suitable NFC link for establishing the Wi-Fi connection between the printer 10 and the mobile terminal 100B.

Figure 6:
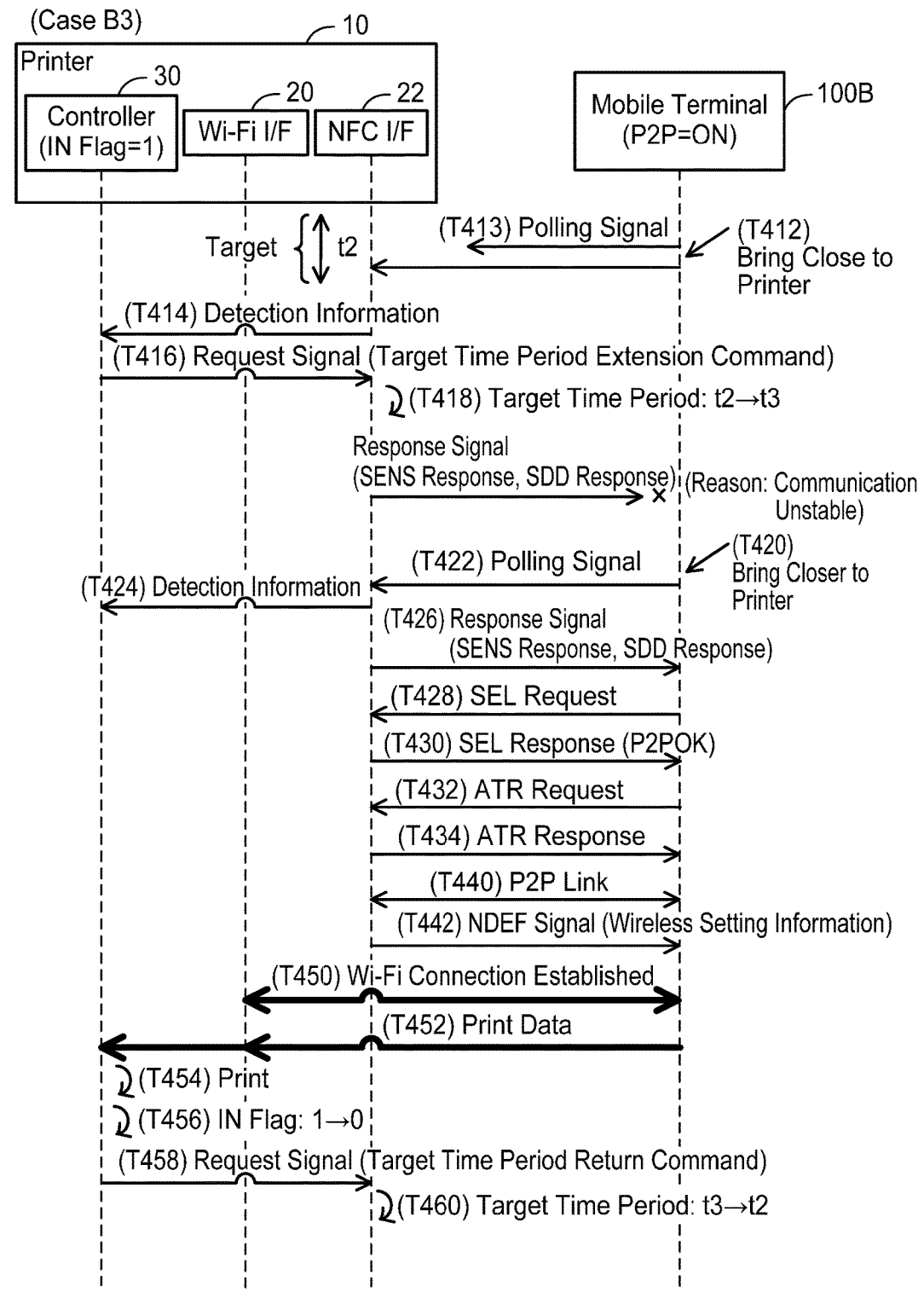
FIG. 6 shows a sequence diagram of Case B3 in which extension of a Target time period is executed.

(Case B3; FIG. 6)

Next, Case B3 which is a continuation of Case B1 of FIG. 4, that is, Case B3 where "1" is set as the IN flag 38 will be described with reference to FIG. 6.

Since the Wi-Fi connection is not established between the printer 10 and the mobile terminal 100B despite the mobile terminal 100B having been brought close to the printer 10 in T222 of FIG. 4, the user brings the mobile terminal 100B close to the printer 10 again in T412 of FIG. 6. In this case, the NFC I/F 22 of the printer 10 operating in the Target state receives a polling signal in T413 sent from the mobile terminal 100B, and supplies the detection information to the controller 30 in T414.

When the detection information is acquired from the NFC I/F 22, the controller 30 of the printer 10 supplies a request signal including a Target time period extension command to the NFC I/F 22 in T416, because the IN flag 38 is set to "1". The Target time period extension command is a command that requests the NFC I/F 22 to change the TA time period upon acquiring the request signal to a time period t3 which is longer than the time period t2. In the case of receiving the detection information in T314 of Case B2 in FIG. 5, the controller 30 does not supply the request signal to the NFC I/F 22 in a state where the IN flag 38 is set to "0".

When the request signal is acquired from the controller 30 in T416, in T418, the NFC I/F 22 of the printer 10 changes the TA time period upon acquiring the request signal from the time period t2 to the time period t3. Due to this, the NFC I/F 22 does not shift to the Initiator after having operated in the Target state over the time period t2, and shifts to the Initiator after having operated in the Target state over the time period t3. This expression of changing the TA time period from the time period t2 to the time period t3 may be expressed as "a terminating timing of the time period t2 is replaced with a terminating timing of the time period t3".

When the polling signal is received from the mobile terminal 100B in T413, the NFC I/F 22 of the printer 10 sends the response signal including the SENS response and the SDD response to the mobile terminal 100B. However, in the present case, the mobile terminal 100B cannot receive the response signal from the printer 10. This is due to a distance between the printer 10 and the mobile terminal 100B being relatively large, and the NFC communication between the printer 10 and the mobile terminal 100B is unstable.

In T420, when the user brings the mobile terminal 100B even closer to the printer 10, the NFC I/F 22 of the printer 10 receives the polling signal from the mobile terminal 100B in T422 while it operates in the Target state over the time period t3 (see T418), and supplies the detection information to the controller 30 in T424. Here, although the IN flag 38 is "1", the controller 30 does not supply the request signal to the NFC I/F 22 again because the request signal has already been supplied. When the polling signal from the mobile terminal 100B is received in T422, the NFC I/F 22 sends the response signal including the SENS response and the SDD response to the mobile terminal 100B in T426.

The mobile terminal 100B can receive the response signal from the printer 10 in T426. T428 to T454 thereafter are similar to T318 to T344 of FIG. 5. That is, the P2P link being the suitable NFC link is established between the printer 10 and the mobile terminal 100B (T440), the communication of the wireless setting information is executed (T442), the Wi-Fi connection is established (T450), and the communication of the print data is executed (T452).

When printing of the image is completed in T454, the controller 30 of the printer 10 changes the IN flag 38 from "1" to "0" in T456. Due to this, the controller 30 no longer supplies the request signal to the NFC I/F 22 even if the detection information is received from the NFC I/F 22. A timing when the controller 30 changes the IN flag 38 from "1" to "0" may be a timing immediately after having supplied the request signal to the NFC I/F 22 in T416, or may be a timing when the Wi-Fi connection is established in T450.

The controller 30 of the printer 10 supplies a request signal including a Target time period return command to the NFC I/F 22 in T458. The Target time period return command is a command requesting the NFC I/F 22 to return the TA time period from the time period t3 to the time period t2. When the request signal is received from the controller 30 in T458, the NFC I/F 22 changes the TA time period from the time period t3 to the time period t2 in T460.

(Effects of Cases B1 to B3)

Figure 7:
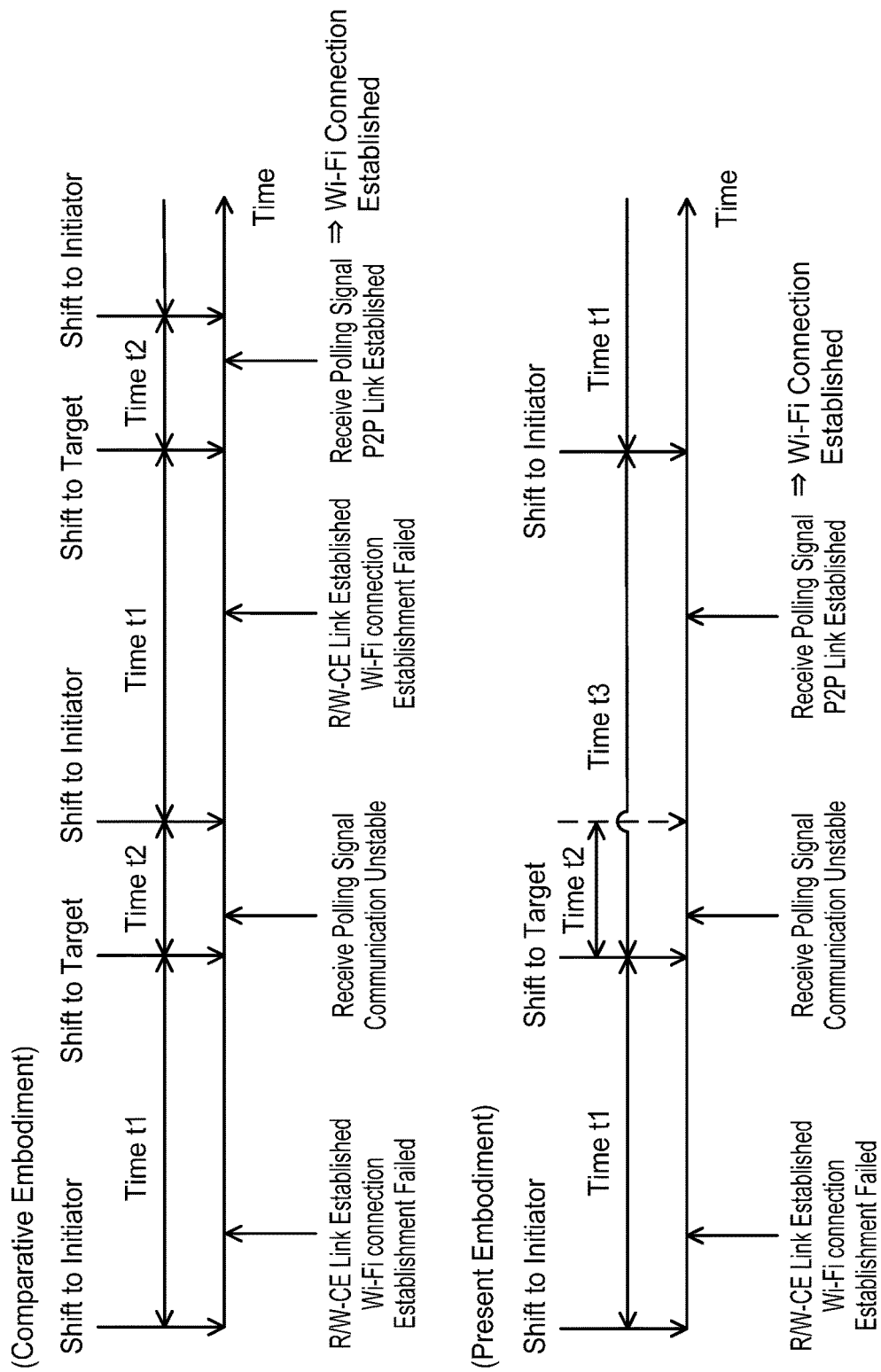
FIG. 7 shows a diagram for explaining differences between a comparative embodiment and the present embodiment.

Effects of Cases B1 to B3 of the present embodiment will be described with reference to FIG. 7. Firstly, an operation of a printer of a comparative embodiment will be described. The printer of the comparative embodiment has a similar configuration as the printer 10 except in that the TA time period is not changed from the time period t2 to the time period t3. That is, the printer cannot establish the P2P link with the mobile terminal 100B in the case of sending a polling signal to the mobile terminal 100B while it operates in the Initiator state, so it establishes the R/W-CE link with the mobile terminal 100B. Thus, the printer cannot establish the Wi-Fi connection with the mobile terminal 100B.

After this, the printer shifts to the Target state when the time period t1 elapses, but the NFC link with the mobile terminal 100B cannot be established even when it receives a polling signal from the mobile terminal 100B while operating in the Target state due to the communication being unstable. Further, the printer shifts to the Initiator state when the time period t2 elapses. Due to this, upon when the user brings the mobile terminal 100B further closer to the printer, the printer is operating in the Initiator state, as a result of which the R/W-CE link is established again with the mobile terminal 100B and the Wi-Fi connection is not established with the mobile terminal 100B.

After this, the printer shifts to the Target state when the time period t1 elapses, and establishes the P2P link with the mobile terminal 100B in the case of receiving the polling signal from the mobile terminal 100B while it operates in the Target state. As a result, the printer can establish the Wi-Fi connection with the mobile terminal 100B.

As above, the printer of the comparative embodiment uses only the time period t2 as the TA time period, so the time period of operating in the Target state is short, and a possibility of receiving the polling signal therein from the mobile terminal 100B is low. As a result, a long time period may be required since the initial R/W-CE link was established until the Wi-Fi connection is established after having established the P2P link.

Next, the operation of the printer 10 of the present embodiment will be described. In the case of sending the polling signal to the mobile terminal 100B while operating in the Initiator state, the printer 10 receives the SEL response including the information "P2PNG" from the mobile terminal 100B (T228 of FIG. 4), and changes the IN flag 38 from "0" to "1" (T230). In this case, the printer 10 establishes the R/W-CE link with the mobile terminal 100B (T240) but does not establish the Wi-Fi connection with the mobile terminal 100B.

After this, the printer 10 shifts to the Target state when the time period t1 elapses, and in the case of receiving the polling signal from the mobile terminal 100B while it operates in the Target state, it changes the TA time period from the time period t2 to the time period t3 (T418 of FIG. 6). Here, the printer 10 cannot establish the NFC link with the mobile terminal 100B due to the communication being unstable. Since the TA time period is extended to the time period t3, the printer 10 does not shift to the Initiator state even when the time period t2 has elapsed, and maintains the Target state. Due to this, when the user further brings the mobile terminal 100B closer to the printer 10, the printer 10 is operating in the Target state, and as a result, the polling signal from the mobile terminal 100B is received (T422) and the P2P link with the mobile terminal 100B can be established (T440). Due to this, the printer 10 can establish the Wi-Fi connection with the mobile terminal 100B (T450).

As above, in the case of sending the polling signal to the mobile terminal 100B while operating in the Initiator state, the printer 10 of the present embodiment changes the IN flag 38 from "0" to "1", and thereafter, in the case of receiving the polling signal from the mobile terminal 100B while operating in the Target state, it uses the time period t3 as the TA time period. Due to this, since the time period of operating in the Target state becomes long, and the possibility of receiving the polling signal therein from the mobile terminal 100B can be increased as compared to the printer of the comparative embodiment. As a result, the printer 10 can establish the P2P link being the suitable NFC link (i.e., NFC link with which the wireless setting information can be sent) with the mobile terminal 100B, and especially the time period since the initial R/W-CE link was established until the Wi-Fi connection is established after having established the P2P link can be made short.

Figure 8:
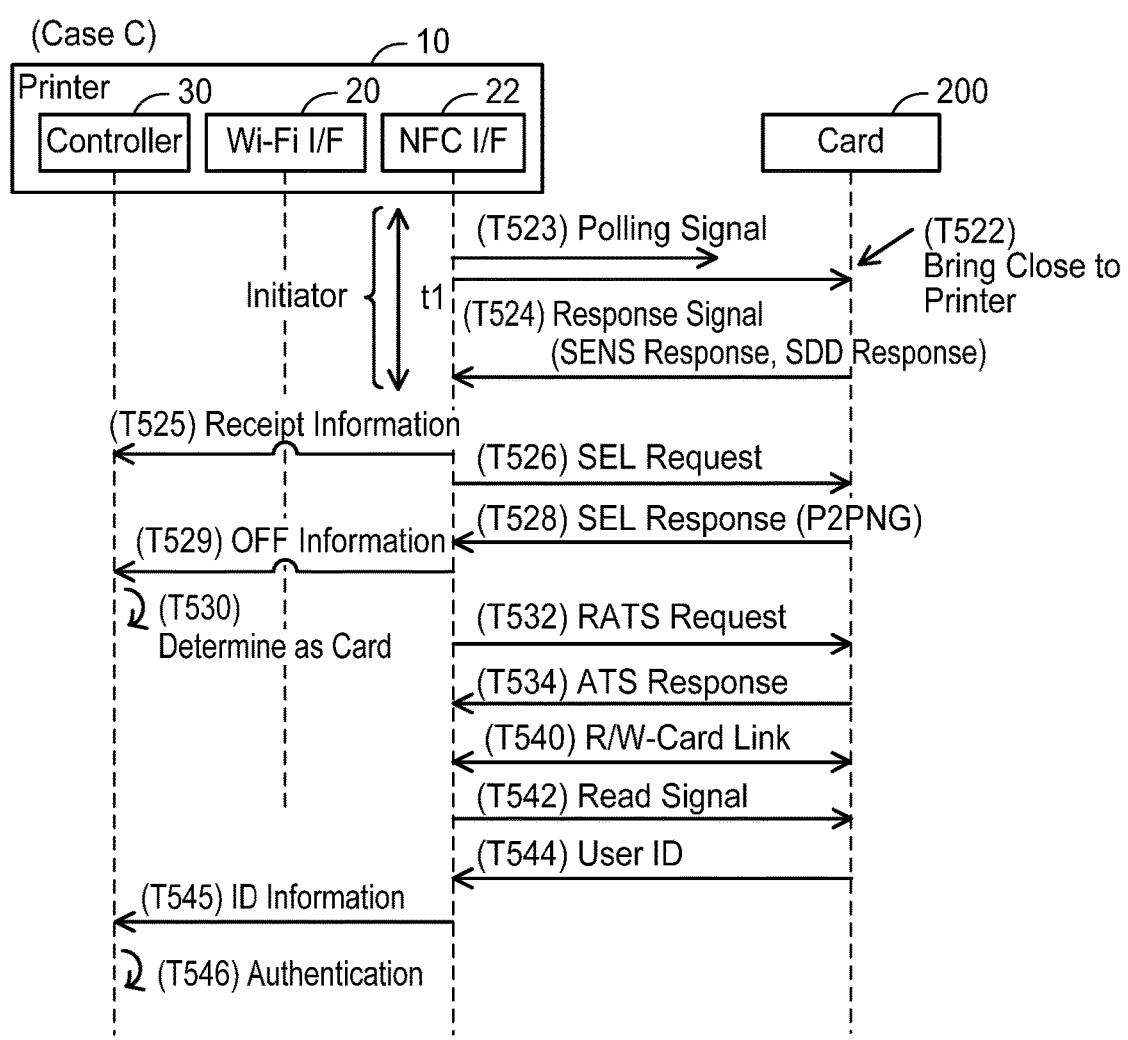
FIG. 8 shows a sequence diagram of Case C in which a R/W-Card link is established between the printer under the Initiator state and a card.

(Case C; FIG. 8)

Next, Case C in which the R/W-Card link is established between the printer 10 operating in the Initiator state and the card 200 will be described with reference to FIG. 8. Here, the card 200 is provided with the NFC I/F being the NFC tag, it cannot operate in any of the P2P mode, the R/W mode, and the HCE mode. Due to this, the R/W-Card link is established between the printer 10 and the card 200 for the NFC I/F 22 of the printer 10 to operate in R/W mode.

T522 to T529 are similar to T222 to T229 of FIG. 4 except that the communication counterpart is the card 200. However, the SENS response included in the response signal of T524 includes the information indicating that the data size of the ID of the card 200 is 7 bytes.

Since the information on the data size included in the SENS response in the receipt information is 7 bytes, the controller 30 of the printer 10 determines in T530 that the communication counterpart is the card 200. The controller 30 determines that the P2P link cannot be established since it acquires the OFF information, however, it does not change the IN flag 38 from "0" to "1" because the communication counterpart is the card 200. Further, the controller 30 supplies information indicating that the communication counterpart is a card to the NFC I/F 22. As above, the controller 30 changes the IN flag 38 from "0" to "1" in the case where the communication counterpart is the mobile terminal 100B for which the TA time period needs to be extended (T230 of FIG. 4), and does not change the IN flag 38 in the case where the communication counterpart is the card 200 for which the TA time period does not need to be extended. The controller 30 can suitably switch between whether or not to change the IN flag 38 according to the communication counterpart. T532 to T540 thereafter are similar to T232 to T240 of FIG. 4 except that the communication counterpart is the card 200.

In T542, the NFC I/F 22 of the printer 10 uses the R/W-Card link established in T540 to send the Read signal for reading data from the card 200 to the card 200, receives the user ID from the card 200 in T544, and supplies the ID information including the user ID in T545 to the controller 30. The controller 30 authenticates the user ID in T546, and executes the process such as printing in the event where the authentication succeeds.

In a variant, a login ID for logging into the printer 10 and the user ID may be associated and stored in the memory 34 of the printer 10. In this case, when the ID information is acquired from the NFC I/F 22 in T545, the controller 30 determines whether or not the user ID in this ID information is stored in the memory 34, and allows login to the printer 10 in a case where this user ID is stored in the memory 34. Further, in another variant, the user ID and shortcut information may be associated and stored in the memory 34 of the printer 10. The shortcut information is for example information indicating a destination of FAX data in a case where the printer 10 is a multi-function peripheral having a FAX function. In this case, when the ID information is acquired from the NFC I/F 22, the controller 30 determines whether or not the user ID in this ID information is stored in the memory 34, and sends the FAX data to the destination included in the shortcut information associated with the user ID in the case where this user ID is stored in the memory 34.

Figure 9:
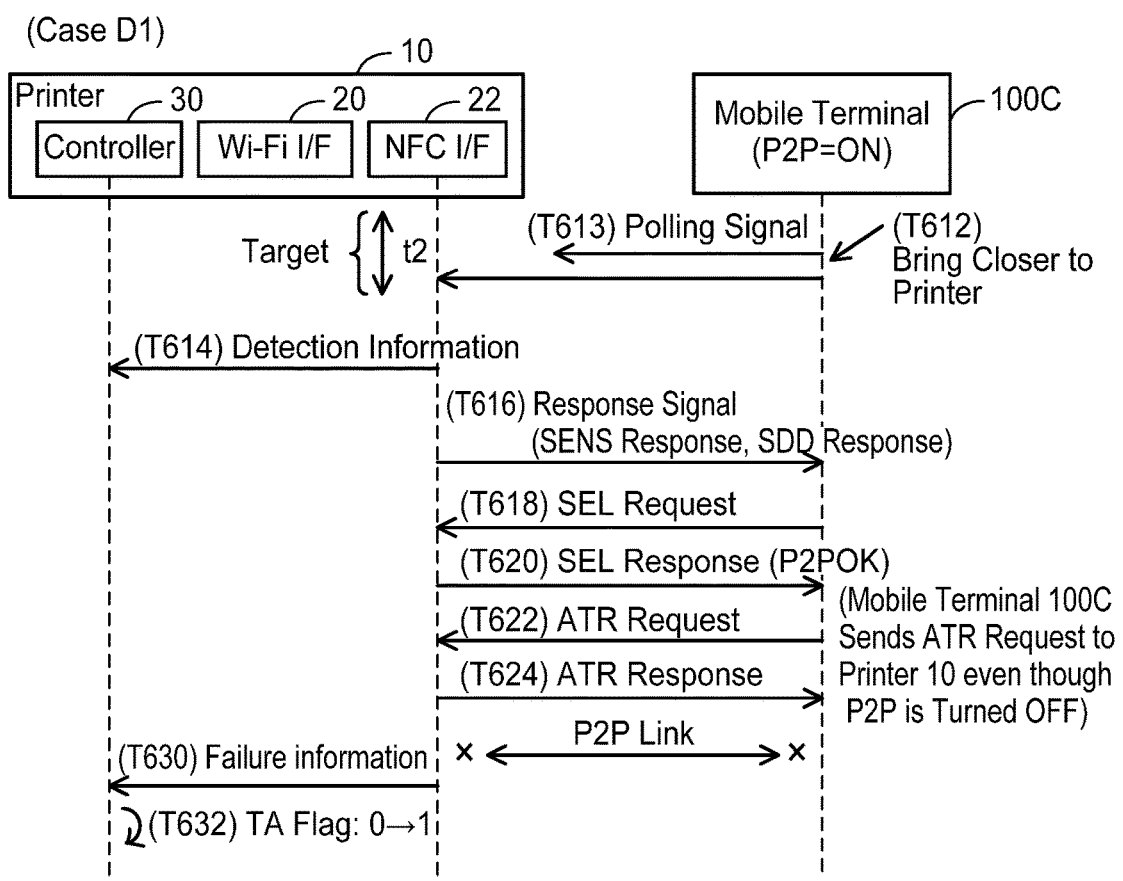
FIG. 9 shows a sequence diagram of Case D1 in which establishment of the P2P link between the printer under the Target state and the mobile terminal fails.

(Case D1; FIG. 9)

Next, Case D1 will be described with reference to FIG. 9. In Case D1, the P2P link is not established between the printer 10 operating in the Target state and the mobile terminal 100C provided with the iOS 136c. In the initial state of FIG. 9, the P2P mode of the mobile terminal 100C is OFF, and the R/W mode and the HCE mode thereof are ON.

T612 to T620 are similar to T112 to T120 of FIG. 3 except in that the mobile terminal 100C is the communication counterpart. In the case of receiving the SEL response including the information "P2POK" from the printer 10 (T620), the NFC I/F of the mobile terminal 100C sends the ATR request requesting to establish the P2P link to the printer 10 in T622 despite its P2P mode being OFF. In T622, the NFC I/F of the mobile terminal 100C sending the ATR request is likely due to a malfunction of the mobile terminal 100C.

When the ATR request from the mobile terminal 100C is received in T622, the NFC I/F 22 of the printer 10 sends the ATR response to the mobile terminal 100C in T624. However, since the P2P mode of the NFC I/F of the mobile terminal 100C is OFF, the P2P link is not established between the NFC I/F 22 of the printer 10 and the NFC I/F of the mobile terminal 100C. Thus, the wireless setting information is not sent from the printer 10 to the mobile terminal 100C, and the Wi-Fi connection is not established between the printer 10 and the mobile terminal 100C.

In T630, the NFC I/F 22 of the printer 10 supplies failure information indicating that the P2P link was not established with the mobile terminal 100C to the controller 30. When the failure information is acquired from the NFC I/F 22, the controller 30 changes the TA flag 40 from "0" to "1" in T632. In a variant, the controller 30 may be configured to change the TA flag 40 from "0" to "1" in a case where the failure information is acquired for a predetermined number of times that is twice or more.

Figure 10:
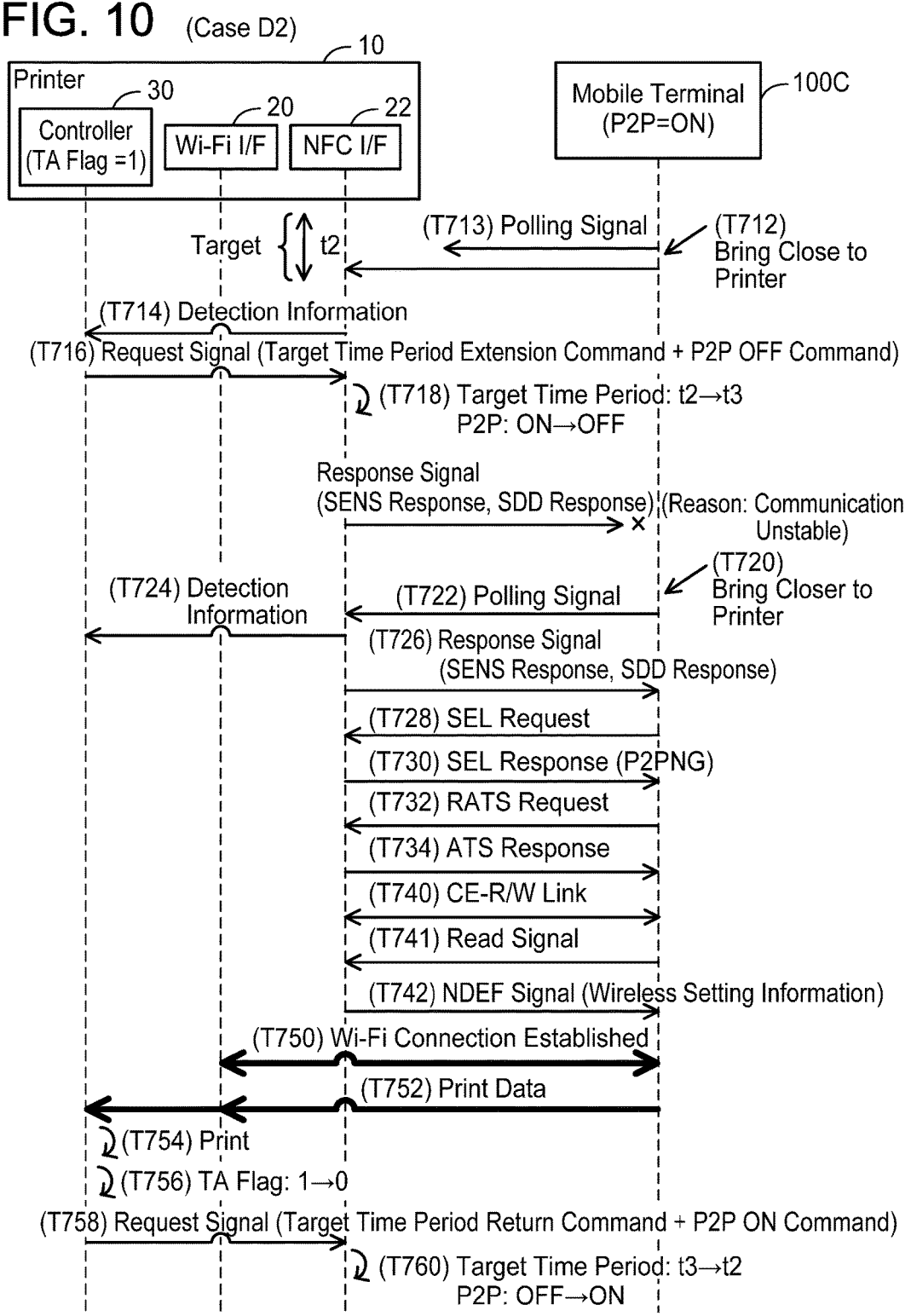
FIG. 10 shows a sequence diagram of Case D2 in which the extension of the Target time period is executed and the P2P mode is disabled.

(Case D2; FIG. 10)

Next, with reference to FIG. 10, Case D2, which is a continuation of Case D1 of FIG. 9, that is, Case D2 in which "1" is set as the TA flag 40 will be described.

T712 to T714 are similar to T612 to T614 of FIG. 9. When the detection information is acquired from the NFC I/F 22, since the TA flag 40 is set to "1", the controller 30 of the printer 10 supplies a request signal including the Target time period extension command and a P2P OFF command to the NFC I/F 22 in T716. The P2P OFF command is a command requesting the NFC I/F 22 to change the P2P mode in the Target state upon acquiring the request signal from ON to OFF. The controller 30 does not supply the request signal to the NFC I/F 22 in the state where the TA flag 40 is "0" in the case of acquiring the detection information in T614 of Case D1 of FIG. 9.

When the request signal is acquired from the controller 30 in T716, the NFC I/F 22 of the printer 10 changes the TA time period upon acquiring the request signal from the time period t2 to the time period t3 in T718, and further changes the P2P mode from ON to OFF. When a polling signal is received from the mobile terminal 100C in T713, the NFC I/F 22 sends the response signal including the SENS response and the SDD response to the mobile terminal 100C. However, in the present case, this response signal is not received by the mobile terminal 100C due to the NFC communication between the printer 10 and the mobile terminal 100C being unstable.

In T720, when the user further brings the mobile terminal 100C closer to the printer 10, the polling signal is received from the mobile terminal 100C in T722 while the NFC I/F 22 of the printer 10 is operating in the Target state over the time period t3 (see T718), and supplies the detection information to the controller 30 in T724. Here, although the IN flag 38 is "1", the controller 30 does not supply the request signal to the NFC I/F 22 again since the request signal has already been supplied.

T726 and T728 are similar to T616 and T618 of FIG. 9. When the SEL request is received from the mobile terminal 100C in T726, the NFC I/F 22 of the printer 10 sends the SEL response including the information "P2PNG" to the mobile terminal 100C in T730 since the P2P mode is OFF (see T718).

Since the NFC I/F of the mobile terminal 100C receives the information "P2PNG" from the printer 10 in T730, it can acknowledge that the NFC I/F 22 of the printer 10 has the P2P mode OFF. Due to this, the NFC I/F of the mobile terminal 100C sends the RATS request requesting to establish the CE-R/W link instead of the P2P link to the printer 10 in T732.

When the RATS request is received from the mobile terminal 100C in T732, the NFC I/F 22 of the printer 10 sends the ATS response to the mobile terminal 100C in T734. As a result, in T740, the CE-R/W link is established between the NFC I/F 22 of the printer 10 and the NFC I/F of the mobile terminal 100C.

When the Read signal is received from the mobile terminal 100C in T741, the NFC I/F 22 of the printer 10 sends the NDEF signal including the wireless setting information to the mobile terminal 100C in T742. This wireless setting information is described in an NDEF area in the NDEF signal. T750 to T754 thereafter are similar to T450 to T454 of FIG. 6.

When printing of the image is completed in T754, the controller 30 of the printer 10 changes the TA flag 40 from "1" to "0" in T756. Then, the controller 30 supplies the request signal including the Target time period return command and a P2P ON command to the NFC I/F 22 in T758. The Target time period return command is the command requesting the NFC I/F 22 to return the TA time period from the time period t3 to the time period t2. The P2P ON command is a command requesting the NFC I/F 22 to change the P2P mode from OFF to ON. When the request signal is acquired from the controller 30 in T758, the NFC I/F 22 changes the TA time period from the time period t3 to the time period t2, and further changes the P2P mode from OFF to ON in T760.

In the NFC I/F of the mobile terminal 100C, the P2P mode is OFF and the R/W mode is ON. Thus, when the communication of the polling signal is executed between the printer 10 operating in the Initiator state and the mobile terminal 100C, the R/W-CE link is established. Specifically, processes similar to T220 to T240 of FIG. 4 are executed between the printer 10 and the mobile terminal 100C. That is, the NFC I/F 22 of the printer 10 cannot send the wireless setting information to the mobile terminal 100C, so the Wi-Fi connection is not established between the printer 10 and the mobile terminal 100C. That is, the CE-R/W link established by the communication of the polling signal between the printer 10 operating in the Target state and the mobile terminal 100C can be said as being a suitable NFC link for establishing the Wi-Fi connection between the printer 10 and the mobile terminal 100C.

(Effects of Cases D1, D2)

Figure 11:
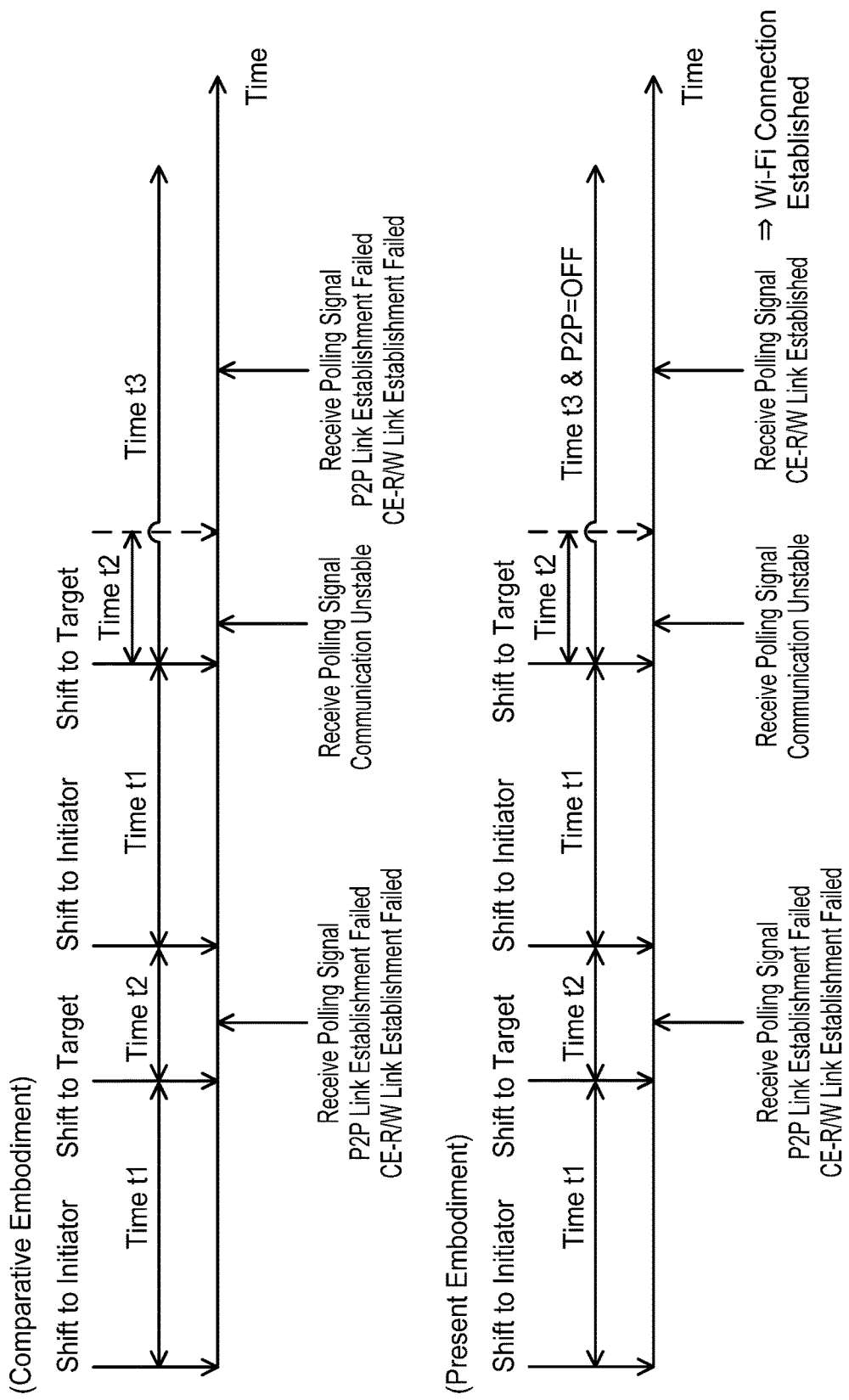
FIG. 11 shows a diagram for explaining differences between a comparative embodiment and the present embodiment.

Effects of Cases D1, D2 of the present embodiment will be described with reference to FIG. 11. Firstly, an operation of a printer of a comparative embodiment will be described. The printer of the comparative embodiment has a similar configuration as the printer 10 except in that the P2P mode is not changed from ON to OFF. That is, in the case of receiving the polling signal from the mobile terminal 100C while operating in the Target state, the printer cannot establish either the P2P link or the CE-R/W link with the mobile terminal 100C due to the mobile terminal 100C sending the ATR request to the printer despite the P2P mode being OFF. In this case, the printer changes the TA flag from "0" to "1". After this, when the printer receives the polling signal from the mobile terminal 100C again while operating in the Target state, it changes the TA time period from the time period t2 to the time period t3. However, the printer cannot establish the NFC link with the mobile terminal 100C due to the communication being unstable. After this, even if the polling signal from the mobile terminal 100C is further received, neither the P2P link nor the CE-R/W link can be established with the mobile terminal 100C due to the mobile terminal 100C sending the ATR request to the printer despite the P2P mode being OFF.

As above, the printer of the comparative embodiment uses the time period t3 as the TA time period, it can increase the possibility of receiving the polling signal from the mobile terminal 100C. However, the printer cannot establish either the P2P link or the CE-R/W link with the mobile terminal 100C due to the mobile terminal 100C sending the ATR request to the printer despite the P2P mode being OFF. Due to this, the printer cannot send the wireless setting information to the mobile terminal 100C, so the Wi-Fi connection with the mobile terminal 100C cannot be established.

Next, the operation of the printer 10 of the present embodiment will be described. In the case of receiving the polling signal from the mobile terminal 100C while operating in the Target state, the printer 10 cannot establish either the P2P link or the CE-R/W link with the mobile terminal 100C due to the mobile terminal 100C sending the ATR request to the printer 10 despite the P2P mode being OFF (T622 of FIG. 9). In this case, the printer 10 changes the TA flag 40 from "0" to "1" (T632). After this, when the printer 10 receives the polling signal from the mobile terminal 100C again while operating in the Target state, it changes the TA time period from the time period t2 to the time period t3, and changes the P2P mode from ON to OFF (T718 of FIG. 10). Here, the printer 10 cannot establish either the P2P link or the CE-R/W link with the mobile terminal 100C due to the communication being unstable. After this, in the case of further receiving the polling signal from the mobile terminal 100C (T722), since the P2P mode is OFF (T718), the printer 10 sends the SEL response including the information "P2PNG" to the mobile terminal 100C (T730). Due to this, the printer 10 receives the RATS request from the mobile terminal 100C (T732), and thus can establish the CE-R/W link with the mobile terminal 100C (T740). As a result, the printer 10 sends the wireless setting information to the mobile terminal 100C (T742), and can establish the Wi-Fi connection with the mobile terminal 100C (T750).

As above, the printer 10 of the present embodiment changes the TA flag 40 from "0" to "1" in the case of receiving the polling signal from the mobile terminal 100C while operating in the Target state, and thereafter in the case of further receiving the polling signal from the mobile terminal 100C while operating in the Target state, it uses the time period t3 as the TA time period and further sets the P2P mode to OFF. Due to this, the time period of operating in the Target state becomes longer, so the possibility of receiving the polling signal from the mobile terminal 100C can be increased, and further, since the P2P mode is set to OFF, the CE-R/W link being a suitable NFC link with the mobile terminal 100C (i.e., the NFC link with which the wireless setting information can be sent) can be established. As a result, the printer 10 can suitably establish the Wi-Fi connection with the mobile terminal 100C.

(Correspondence Relationship)

The printer 10, the NFC I/F 22, the memory 34, and the memory 24 are respectively examples of a "communication device", a "wireless interface", a "main memory", and an "interface memory". The Initiator state and the Target state are respectively examples of a "first state" and a "second state". The time period t1 of the IN time period, the time period t2 of the TA time period, and the time period t3 of the TA time period are respectively examples of a "first predetermined time period", a "second predetermined time period", and a "specific time period". The polling signal sent from the printer 10 and the polling signals sent from the mobile terminals 100A to 100C are respectively examples of a "first polling signal" and a "second polling signal". The Initiator flag 38 and the Target flag 40 are respectively examples of a "first flag" and a "second flag". The wireless setting information is an example of "first target data" and "second target data".

In one aspect, the mobile terminal 100B and the mobile terminal 100A are respectively examples of a "specific external device" and a "different external device". The P2P link is an example of a "first wireless link" and a "second wireless link". The R/W-CE link and the R/W-Card link are respectively examples of a "third wireless link" and a "fourth wireless link". T414 of FIG. 6 and T416 of FIG. 6 are respectively examples of "acquire detection information from the wireless interface" and "supply a specific signal to the wireless interface".

In another aspect, the mobile terminal 100C and the mobile terminal 100A are respectively examples of the "specific external device" and the "different external device". The P2P link and the CE-R/W link are respectively examples of the "first wireless link" and the "second wireless link". The P2P link of which establishment fails between the printer 10 and the mobile terminal 100C in FIG. 9 is an example of a "fifth wireless link". The SEL request and the SEL response are respectively examples of a "specific request" and "specific response". The information "P2POK" is an example of "enablement information". T714 and T716 of FIG. 10 are respectively examples of "acquire detection information from the wireless interface" and "supply a specific signal to the wireless interface".

(Variant 1) The "wireless interface" may be an interface configured to execute a wireless communication using a Bluetooth (registered trademark) scheme. In this case, the "first polling signal" and the "second polling signal" are signals for establishing a wireless link under the Bluetooth scheme. Further, in this case, the "wireless interface" does not detect a change in a magnetic field even when a polling signal is received from the "specific external device".

(Variant 2) The Target time period extension command in T416 of FIG. 6 and T716 of FIG. 10 may be a command which further requests the TA time period to be changed from the time period t2 to the time period t3 and the IN time period from the time period t1 to a time period t4 which is different from the time period t1. Further, in another variant, the Target time period extension command may not be a command requesting to change the TA time period of the Target state upon acquiring the request signal from the time period t2 to the time period t3, and may be a command which requests to change the TA time period for the Target state, which is after the current Target state, from the time period t2 to the time period t3.

(Variant 3) The P2P OFF command in T716 of FIG. 10 may not be a command that requests to change the P2P mode in the Target state upon acquiring the request signal from ON to OFF, and may be a command which requests to change the P2P mode in the Target state, which is after the current Target state, from ON to OFF. Further, in another variant, the P2P OFF command may not be a command which requests to change only the P2P mode in the Target state from ON to OFF, and may be a command which requests to change the P2P mode in both the Target state and the Initiator state from ON to OFF.

(Variant 4) The request signal in T414 of FIG. 6 may be a signal including the Target time period extension command and the P2P OFF command. In this case, the NFC I/F 22 changes the TA time period upon acquiring the request signal from the time period t2 to the time period t3, and further changes the P2P mode from ON to OFF. After this, processes similar to T720 to T754 of FIG. 10 are executed in the printer 10 and the mobile terminal 100B. That is, the CE-RW link is established between the NFC I/F 22 and the mobile terminal 100B, and the NFC I/F 22 sends the NDEF signal including the wireless setting information to the mobile terminal 100B using the CE-RW link. As a result, the Wi-Fi connection is established between the printer 10 and the mobile terminal 100B.

(Variant 5) The request signal in T716 of FIG. 10 may be a signal that does not include the Target time period extension command but includes the P2P OFF command. In this case, the NFC I/F 22 may change the P2P mode from ON to OFF without extending the TA time period.

(Variant 6) The memory 34 may not store the IN flag 38. In this variant, the controller 30 supplies the request signal including the Target time period extension command to the NFC I/F 22 even in the case of acquiring the detection information from the NFC I/F 22 in T114 of FIG. 3 or T314 of FIG. 5. In this variant, "store a first flag in the main memory" may be omitted.

(Variant 7) The memory 34 may not store the TA flag 40. In this variant, the controller 30 supplies the request signal including the P2P OFF command to the NFC I/F 22 even in the case of acquiring the detection information from the NFC I/F 22 in T614 of FIG. 9, for example. In this variant, "store a second flag in the main memory" may be omitted.

(Variant 8) The NFC I/F 22 of the printer 10 may set the HCE mode to OFF in the Target state. Further, the NFC I/F 22 may change the P2P mode from ON to OFF and further change the HCE mode from OFF to ON in the case of acquiring the request signal from the controller 30 in T716 of FIG. 10. To describe in general terms, the "wireless interface" may not enable the HCE mode in the second state before acquiring the specific signal from the controller.

(Variant 9-1) The NFC I/F 22 of the printer 10 may set the P2P mode to ON in the Initiator state and the P2P mode to OFF in the Target state. In this variant, the CE-R/W link is established instead of the P2P link being established between the printer 10 and the mobile terminal 100B in FIGS. 5 and 6. Further, in this variant, a case will be described in which the P2P OFF command in FIG. 10 is the command which requests to change the P2P mode in both the Target state and the Initiator state from ON to OFF. In this case, the NFC I/F 22 may operate in the Initiator state in which the P2P mode is OFF and the R/W mode is ON after having acquired the request signal from the controller 30.

(Variant 9-2) The NFC I/F 22 of the printer 10 may set the P2P mode to OFF in the Initiator state and the P2P mode to ON in the Target state. In this variant, similar to Case D2 of FIG. 10, the NFC I/F 22 changes the P2P mode from ON to OFF in the case of acquiring the request signal including the P2P OFF command from the mobile terminal 100C. Due to this, the NFC I/F 22 operates in the Target state in which the P2P mode is OFF and the HCE mode is ON.

(Variant 10) The controller 30 of the printer 10 may not supply the P2P ON command to the NFC I/F 22 in T758 of FIG. 10. In this variant, the NFC I/F 22 may change the P2P mode from OFF to ON in a case where a power of the printer 10 is turned ON after having been turned OFF by the user, or a case where an operation to set the P2P mode to ON by the user is performed on the operation unit 12. In this variant, "supply an enabling signal to the wireless interface" may be omitted.

(Variant 11) When the P2P link is established in T440 of FIG. 6, the NFC I/F 22 of the printer 10 may shift from the Target state to the Initiator state even before the TA time period elapses the time period t3. Further, in another variant, the NFC I/F 22 of the printer 10 may continue to operate in the Target state until the P2P link is established with its communication counterpart in the case of acquiring the request signal including the Target time period extension command from the controller 30 in T416 of FIG. 6. That is, the NFC I/F 22 stops the shifting from the Target state to the Initiator state until the P2P link is established with its communication counterpart. In this variant, in a case where a time period of the Target state, which is to continue until the P2P link is established, becomes longer than the time period t2, this time period is an example of the "specific time period".

(Variant 12) The data which the printer 10 sends to its communication counterpart using the P2P link and the like established in T440 of FIG. 6 may not be limited to the wireless setting information, and may be a URL (abbreviation of Uniform Resource Locator) of a webpage indicating a content of an error occurring in the printer 10, or may be a URL of a webpage indicating the content of the error and how to resolve it.

(Variant 13) The NFC I/F 22 may be capable of operating in the CE mode, which does not require a secure element instead of in the HCE mode which requires a secure element.

(Variant 14) The NFC I/F 22 of the printer 10 may determine whether the communication counterpart is a mobile terminal or a card after the R/W-CE link or the R/W-Card link is established with the communication counterpart in the Initiator state. Specifically, the NFC I/F 22 determines that the communication counterpart is a mobile terminal in a case of receiving the information indicating the communication counterpart is the mobile terminal from the communication counterpart after the R/W-CE link has been established with the communication counterpart. In this case, the NFC I/F 22 does not send the Read signal to the communication counterpart. Further, the NFC I/F 22 determines that the communication counterpart is a card in a case of receiving the information indicating the communication counterpart is the card from the communication counterpart after the R/W-Card link has been established with the communication counterpart. In this case, the NFC I/F 22 sends the Read signal to the communication counterpart. That is, the controller 30 may not determine whether the communication counterpart is a mobile terminal or a card in T30 of FIG. 2, T230 of FIG. 4, and T530 of FIG. 8.

(Variant 15) The "communication device" is not limited to the printer 10, and may be a scanner, a multi-function peripheral, a PC, a server, a smartphone, and the like.

(Variant 16) In the above embodiments, the respective processes executed by the controller 30 are implemented by software (that is, the program 36), however, at least one of these processes may be implemented by hardware such as a logic circuit.

What is claimed is:

1. A communication device comprising:
a wireless interface configured to repeat operating sequentially in a plurality of states including a first state and a second state, the first state being a state where the wireless interface sends a first polling signal over a first predetermined time period, the first polling signal being for establishing a wireless link with an external device, the second state being a state where the wireless interface waits for receiving a second polling signal over a second predetermined time period, the second polling signal being for establishing a wireless link with the communication device and being sent from an external device;
a processor; and
a main memory storing computer-readable instructions therein, the computer-readable instructions, when executed by the processor, causing the communication device to:
acquire detection information from the wireless interface in a case where the wireless interface operating in the second state receives the second polling signal from a specific external device; and
supply a specific signal to the wireless interface in a case where the detection information is acquired from the wireless interface operating in the second state, the specific signal being for causing the wireless interface to use, as a duration time period of the second state, a specific time period instead of the second predetermined time period, the specific time period being longer than the second predetermined time.

2. The communication device as in claim 1, wherein
the wireless interface is configured to shift to the first state of sending the first polling signal over the first predetermined time period after operating, in response to the specific signal being supplied from the processor, in the second state of waiting for receiving the second polling signal over the specific time period.

3. The communication device as in claim 1, wherein
in the case where the detection information is acquired from the wireless interface operating in the second state, the specific signal is supplied to the wireless interface before the wireless interface shifts to the first state, and the specific signal is for causing the wireless interface to use, as the duration time period of the second state in which the specific signal was acquired, the specific time period instead of the second predetermined time period.

4. The communication device as in claim 1, wherein
the wireless interface is for executing a wireless communication according to a Near Field Communication (NFC) scheme,
the detection information is acquired from the wireless interface in a case where the wireless interface operating in the second state receives the second polling signal from the specific external device, the second state being a state where at least a Peer to Peer (P2P) mode of the NFC scheme is enabled, and
the specific signal is for further causing the wireless interface to achieve a state where the P2P mode is disabled and a Card Emulation (CE) mode of the NFC scheme is enabled in the second state.

5. The communication device as in claim 4, wherein
the wireless interface is under a state where the CE mode is enabled in the second state before acquiring the specific signal from the processor, and maintains the state where the CE mode is enabled in the second state in the case where the specific signal is acquired from the processor.

6. The communication device as in claim 1, wherein
the wireless interface is configured to:
send, in the first state, first target data to a different device which is different from the specific external device in a case where a first wireless link is established with the different device in response to sending the first polling signal to the different device; and
send, in the second state, second target data to the specific external device in a case where a second wireless link is established with the specific external device in response to receiving the second polling signal from the specific external device, and
the first target data and the second target data include same information.

7. The communication device as in claim 6, wherein
the wireless interface comprises an interface memory, and
the computer-readable instructions, when executed by the processor, further cause the communication device to:
cause the wireless interface to store the second target data in the interface memory before the second wireless link is established with the specific external device, and
the wireless interface is configured to send the second target data stored in the interface memory to the specific external device in a case where the second wireless link has been established with the specific external device.

8. The communication device as in claim 1, wherein
the computer-readable instructions, when executed by the processor, further cause the communication device to:
store a first flag in the main memory in a case where the wireless interface establishes a third wireless link with the specific external device; and
supply the specific signal to the wireless interface in a case where the detection information is acquired from the wireless interface under a state where the first flag is stored in the main memory, and
the specific signal is not supplied to the wireless interface in a case where the detection information is acquired from the wireless interface under a state where the first flag is not stored in the main memory.

9. The communication device as in claim 8, wherein
the first flag is not stored in the main memory in a case where the wireless interface establishes a fourth wireless link with a card.

10. The communication device as in claim 1, wherein
the computer-readable instructions, when executed by the processor, further cause the communication device to:
store a second flag in the main memory in a case where the wireless interface fails to establish a fifth wireless link with the specific external device; and
supply the specific signal to the wireless interface in a case where the detection information is acquired from the wireless interface under a state where the second flag is stored in the main memory, and
the specific signal is not supplied to the wireless interface in a case where the detection information is acquired from the wireless interface under a state where the second flag is not stored in the main memory.

11. The communication device as in claim 1, wherein
the detection information is acquired from the wireless interface in a case where the wireless interface detects a change in a magnetic field in response to receiving the polling signal from the specific external device.

12. A communication device comprising:
a wireless interface configured to execute a wireless communication according to a Near Field Communication (NFC) scheme;
a processor; and
a main memory storing computer-readable instructions therein, the computer-readable instructions, when executed by the processor, causing the communication device to:
acquire detection information from the wireless interface in a case where a polling signal is received from a specific external device in the wireless interface under a state where at least a Peer to Peer (P2P) mode of the NFC scheme is enabled; and
supply a specific signal to the wireless interface in a case where the detection information is acquired from the wireless interface in which at least the P2P mode is enabled, the specific signal being for causing the wireless interface to achieve a state where the P2P mode is disabled and at least one mode of a Card Emulation (CE) mode and a Reader Writer (R/W) mode of the NFC scheme is enabled,
wherein the wireless interface is configured to repeat operating sequentially in a plurality of states including a first state and a second state,
the first state is a state where the wireless interface sends a first polling signal over a first predetermined time period, the first polling signal being for establishing a wireless link with an external device,
the second state is a state where the wireless interface waits for receiving a second polling signal over a second predetermined time period, the second polling signal being for establishing a wireless link with the communication device and being sent from an external device,
the detection information is acquired from the wireless interface in a case where the wireless interface, receives the second polling signal from the specific external device in the second state where at least the P2P mode is enabled, and
the specific signal is for causing the wireless interface to achieve a state where the P2P mode is disabled and the CE mode is enabled in the second state.

13. The communication device as in claim 12, wherein
in the case where the detection information is acquired from the wireless interface operating in the second state, the specific signal is supplied to the wireless interface before the wireless interface shifts to the first state, and
the specific signal is for causing the wireless interface to achieve a state where the P2P mode is disabled and the CE mode is enabled in the second state in which the specific signal was acquired.

14. The communication device as in claim 12, wherein
the wireless interface is configured to send a specific response not including enablement information to the specific external device in a case where a specific request is received from the specific external device under a state where the P2P mode is disabled, the enablement information indicating that the wireless interface is under a state where the P2P mode is enabled.

15. The communication device as in claim 12, wherein
the wireless interface is under a state where the at least one mode is enabled before acquiring the specific signal from the processor, and maintains the state where the at least one mode is enabled in a case where the specific signal is acquired from the processor.

16. The communication device as in claim 12, wherein
the wireless interface is configured to:
send first target data to a different device which is different from the specific external device in a case where a first wireless link is established with the different device under a state where the P2P mode is enabled, the first wireless link being for both the communication device and the different device to operate in the P2P mode; and
send second target data to the specific external device in a case where a second wireless link is established with the specific external device under a state where the P2P is disabled and the at least one mode is enabled, the second wireless link being for the communication device to operate in one mode of the CE mode and the R/W mode, and
the first target data and the second target data include same information.

17. The communication device as in claim 16, wherein
the computer-readable instructions, when executed by the processor, further cause the communication device to:
supply an enabling signal to the wireless interface after the second target data has been sent to the specific external device, the enabling signal being for causing the wireless interface to change from a state where the P2P mode is disabled to a state where the P2P mode is enabled.

18. The communication device as in claim 16, wherein
the wireless interface comprises an interface memory, and
the computer-readable instructions, when executed by the processor, further cause the communication device to:
cause the wireless interface to store the second target data in the interface memory before the second wireless link is established with the specific external device, and
the wireless interface is configured to send the second target data stored in the interface memory to the specific external device in a case where the second wireless link has been established with the specific external device.

19. The communication device as in claim 12, wherein
the computer-readable instructions, when executed by the processor, further cause the communication device to:

store a first flag in the main memory in a case where the wireless interface establishes a third wireless link with the specific external device; and supply the specific signal to the wireless interface in a case where the detection information is acquired from the wireless interface under a state where the first flag is stored in the main memory, and the specific signal is not supplied to the wireless interface in a case where the detection information is acquired from the wireless interface under a state where the first flag is not stored in the main memory.

20. The communication device as in claim 19, wherein the first flag is not stored in the main memory in a case where the wireless interface establishes a fourth wireless link with a card.

21. The communication device as in claim 12, wherein the computer-readable instructions, when executed by the processor, further cause the communication device to:

store a second flag in the main memory in a case where the wireless interface fails to establish a fifth wireless link with the specific external device; and supply the specific signal to the wireless interface in a case where the detection information is acquired from the wireless interface under a state where the second flag is stored in the main memory, and the specific signal is not supplied to the wireless interface in a case where the detection information is acquired from the wireless interface under a state where the second flag is not stored in the main memory.

22. The communication device as in claim 12, wherein the detection information is acquired from the wireless interface in a case where the wireless interface detects a change in a magnetic field in response to receiving the polling signal from the specific external device.

23. A non-transitory computer-readable recording medium storing computer-readable instructions for a communication device, the communication device comprising:

a wireless interface configured to repeat to operate sequentially in a plurality of states including a first state and a second state, the first state being a state where the wireless interface sends a first polling signal over a first predetermined time period, the first polling signal being for establishing a wireless link with an external device, the second state being a state where the wireless interface waits for receiving a second polling signal over a second predetermined time period, the second polling signal being for establishing a wireless link with the communication device and being sent from an external device; and a processor, wherein the computer-readable instructions, when executed by the processor, cause the communication device to:

acquire detection information from the wireless interface in a case where the wireless interface operating in the second state receives the second polling signal from a specific external device; and supply a specific signal to the wireless interface in a case where the detection information is acquired from the wireless interface operating in the second state, the specific signal being for causing the wireless interface to use, as a duration time period of the second state, a specific time period instead of the second predetermined time period, the specific time period being longer than the second predetermined time.

* * * * *